US012645750B2

(12) United States Patent
Sylvester et al.

(10) Patent No.: US 12,645,750 B2
(45) Date of Patent: Jun. 2, 2026

(54) HARDWARE EFFICIENT WEIGHT STRUCTURE FOR SPARSE DEEP NEURAL NETWORKS

(71) Applicant: THE REGENTS OF THE UNIVERSITY OF MICHIGAN, Ann Arbor, MI (US)

(72) Inventors: Dennis Sylvester, Ann Arbor, MI (US); David Blaauw, Ann Arbor, MI (US); Yu Chen, Ann Arbor, MI (US); Pierre Abillama, Ann Arbor, MI (US); Hun-Seok Kim, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 1143 days.

(21) Appl. No.: 17/674,470

(22) Filed: Feb. 17, 2022

(65) Prior Publication Data
US 2023/0244746 A1 Aug. 3, 2023

Related U.S. Application Data

(60) Provisional application No. 63/305,374, filed on Feb. 1, 2022.

(51) Int. Cl.
| | |
|---|---|
| *G06F 17/14* | (2006.01) |
| *G06F 17/16* | (2006.01) |
| *G06N 3/08* | (2023.01) |

(52) U.S. Cl.
CPC ............ *G06F 17/145* (2013.01); *G06F 17/16* (2013.01); *G06N 3/08* (2013.01)

(58) Field of Classification Search
CPC ...... G06F 17/14; G06F 17/145; G06F 17/156; G06F 17/16; G06F 7/5443; G06N 3/045; G06N 3/08; G06N 3/084; G06T 5/00; G06T 5/60; G06T 2207/20081; G06T 2207/20084
See application file for complete search history.

(56) References Cited

U.S. PATENT DOCUMENTS

| | | | | |
|---|---|---|---|---|
| 5,270,953 A | * | 12/1993 | White | G06F 17/142 708/321 |
| 11,580,191 B1 | * | 2/2023 | Gural | G06F 17/16 |
| 2017/0344876 A1 | * | 11/2017 | Brothers | G06F 17/153 |

(Continued)

OTHER PUBLICATIONS

Y. Chen et al., "HTNN Deep Learning in Heterogeneous Transform Domains with Sparse-Orthogonal Weights", Jul. 2021 (Year: 2021).*

(Continued)

*Primary Examiner* — Maria De Jesus Rivera
(74) *Attorney, Agent, or Firm* — Harness, Dickey & Pierce, P.L.C.

(57) ABSTRACT
A computer-implemented method is presented for performing a computation with a neural network. The method includes: receiving a first input patch of data; applying a Walsh-Hadamard transform to the input patch to yield a transformed input patch in a transformed domain; computing an element-wise product of the transformed input patch and a kernel of the neural network; applying an inverse Walsh-Hadamard transform to the element-wise product to yield an intermediate matrix; and creating a first output patch from the intermediate matrix, where the size of the first output patch is smaller than the intermediate matrix.

24 Claims, 18 Drawing Sheets

(56) References Cited

U.S. PATENT DOCUMENTS

| | | | |
|---|---|---|---|
| 2020/0167637 A1* | 5/2020 | Park | G06F 7/44 |
| 2021/0118110 A1* | 4/2021 | Langlois | G02B 21/14 |
| 2021/0191765 A1* | 6/2021 | Bokam | G06F 30/20 |
| 2021/0294873 A1* | 9/2021 | Shafiee Ardestani | G06N 3/045 |

OTHER PUBLICATIONS

W. Pratt et al., "Hadamard Transform Image Coding", 1969. (Year: 1969).*

Song Han; Xingyu Liu; Huizi Mao; Jing Pu; Ardavan Pedram; Mark A. Horowitz; William J. Dally, "EIE: Efficient Inference Engine on Compressed Deep Neural Network". IEEE/ACM International Symposium on Computer Architecture, 2016.

Chen, Yu-Hsin; Emer, Joel; Sze, Vivienne, "Eyeriss: A Spatial Architecture for Energy-Efficient Dataflow for Convolutional Neural Networks". IEEE/ACM International Symposium on Computer Architecture, 2016.

Parashar, Angshuman; Rhu, Minsoo; Mukkara, Anurag; Puglielli, Antonio; Venkatesan, Rangharajan; Khailany, Brucek; Emer, Joel;

Keckler, Stephen W.; Dally, William J., "SCNN: An Accelerator for Compressed-Sparse Convolutional Neural Networks". IEEE/ACM International Symposium on Computer Architecture, 2017.

Chen, Yu; Liu, Bowen; Abillama, Pierre; Kim, Hun-Seok, "HTNN: Deep Learning in Heterogeneous Transform Domains with Sparse-Orthogonal Weights". IEEE/ACM International Symposium on Low Power Electronics and Design, 2021.

An, Hyochan; Schiferl, Sam; Venkatesan, Siddharth; Wesley, Tim; Zhang, Qirui; Wang, Jingcheng; Choo, Kyojin D.; Liu, Shiyu; Liu, Bowen; Li, Ziyun; Gong, Luyao; Zhong, Hengfei; Blaauw, David; Dreslinski, Ronald; Kim, Hun Seok; Sylvester, Dennis, "An Ultra-Low-Power Image Signal Processor for Hierarchical Image Recognition With Deep Neural Networks". IEEE Journal of Solid-State Circuits, 2021.

Song Han, Huizi Mao, William J. Dally, "Deep Compression: Compressing Deep Neural Networks with Pruning, Trained Quantization and Huffman Coding". International Conference on Learning Representations, 2016.

Xingyu Liu and Jeff Pool and Song Han and William J. Dally, "Efficient Sparse-Winograd Convolutional Neural Networks". International Conference on Learning Representations, 2018.

* cited by examiner

Order 1: Output Stationary (OS)
for p in range (0, N²/4)
  for o in range (0, OC/NT)
    for i in range (0, IC)
      result += DEMUX(
      MUX(trans_buff [i])
      .* wt_buf [o] [i])

Order 2: Weight Stationary (WS)
for o in range (0, OC/NT)
  for i in range (0, IC)
    for p in range (0, N²/4)
      acc_buff [p] [o] += DEMUX(D
      .* MUX(trans_buff [p] [i]))

Order 3: Input Stationary (IS)
for p in range (0, N²/4)
  for i in range (0, IC)
    for o in range (0, OC/NT)
      acc_buff [o] += DEMUX(Mp
      .* wt_buff [o] [i])

HARDWARE EFFICIENT WEIGHT STRUCTURE FOR SPARSE DEEP NEURAL NETWORKS

CROSS REFERENCE TO RELATED APPLICATION

This application claims the benefit of U.S. Provisional Application No. 63/305,374, filed on Feb. 1, 2022. The entire disclosure of the above application is incorporated herein by reference.

FIELD

The present disclosure relates to a hardware efficient weight structure for sparse deep neural networks.

BACKGROUND

Recent deep convolutional neural networks (CNNs) report superb performance in various computer vision tasks. However, while the accuracy of CNNs evolved drastically, their complexity has also grown super-linearly. It is a significant challenge to deploy large CNNs for real-time applications on energy-constrained Internet-of-Things (IoT) platforms that cannot afford powerful and energy-intensive GPUs. Since the biggest portion of computation comes from convolution layers, implementing convolution kernels in an efficient way has become a main premise of successful adoption of CNNs on power- and cost-constrained mobiles devices.

Many efficient strategies have been proposed to reduce the complexity of CNNs. One main direction is to replace convolution with element-wise multiplications using Winograd's minimal filtering algorithm or discrete Fourier transforms (DFT). Another popular direction is to compress the CNN models by weight pruning and quantization to reduce the computation and memory requirements. However, it is not straightforward to apply both techniques at the same time because the sparse spatial weights obtained by pruning are no longer sparse after the transformation in the first technique.

This disclosure proposes a new non-convolution based framework to take advantage of both techniques. Unlike previous work, this disclosure explores the possibility to train deep neural networks (DNNs) in heterogeneous transform domains where convolution is replaced by element-wise multiplication which is (unlike Winograd) no longer equivalent to spatial convolution. To further reduce the computation overhead, this disclosure proposes to use binary-valued fast linear transforms with Nlog (N) complexity such as discrete Walsh-Hadamard transform (WHT).

The proposed networks are trained with sparse-orthogonal kernels in heterogeneous transform domains. In this approach, two or more kernels in different transform domains can share a hardware multiplier without conflict as the positions of nonzero weights are strictly orthogonal to each other. Thus, this approach is more hardware-friendly as it allows parallelized computation of multiple sparse kernels in DNN hardware accelerators with simple multiplexers. Finally, a canonical signed-digit (CSD) representation based novel bit-sparse non-uniform quantization is proposed and demonstrated to reduce the density of non-zero digits in quantized weights and compute each multiplication with additions/subtractions.

This section provides background information related to the present disclosure which is not necessarily prior art.

SUMMARY

This section provides a general summary of the disclosure, and is not a comprehensive disclosure of its full scope or all of its features.

A computer-implemented method is presented for performing a computation with a neural network. The method includes receiving a first input patch of data; applying a Walsh-Hadamard transform to the input patch to yield a transformed input patch in a transformed domain; computing an element-wise product of the transformed input patch and a kernel of the neural network; applying an inverse Walsh-Hadamard transform to the element-wise product to yield an intermediate matrix; and creating a first output patch from the intermediate matrix, where the size of the first output patch is smaller than the intermediate matrix.

In one aspect, the input patch may be processed in two or more transform domains. In such cases, the kernels of the neural network can be trained such that non-zero kernel weights of the neural network are strictly non-overlapping across the transform domains.

This technique can also be extended to inputs having two or more input channels. In this case, the method includes: receiving a first set of input patches, where each input patch in the first set of input patches corresponds to a different channel of the input and each input patch in the first set of input patches is extracted from same location in the input; for each input patch in the first set of input patches, processing a given input patch in two or more transform domains to yield an intermediate matrix for each of the two or more transform domains; summing the intermediate matrices in a given transform domain together; and for each of the two or more transform domains, creating a first output patch from the summed intermediate matrix, where the size of the first output patch is smaller than the summed intermediate matrix. Processing a given input patch in a given transform domain further includes applying a Walsh-Hadamard transform to a given input patch to yield a transformed input patch in the given transform domain and computing an element-wise product of the transformed input patch and a kernel of the neural network.

In another aspect, a computer-implemented method is presented for performing computation in hidden layer of a neural network. The method includes: a) receiving an input patch of data from an input feature map; b) processing the input patch in two or more transform domains to yield a transformed input matrix; c) selecting a given output channel from the plurality of output channels; d) for each input channel in the plurality of input channels, computing an element-wise product of the transformed input matrix and a given kernel to yield an intermediate matrix, where the given kernel corresponds to the input channel and the given output channel; e) summing the intermediate matrices in a given domain together; f) creating an output patch for an output feature map from the summed intermediate matrices; and g) selecting another output channel from the plurality of output channels and repeating steps d)-f) until each output channel in the plurality of output channels has been processed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Walsh-Hadamard transform and permuted variants Walsh-Hadamard transform (WHT) is a generalized class of Fourier transforms. The 1D WHT is a linear transform with the transform matrix H, and omitting the normalization factor, H only contains +1 and −1. Thus, WHT is implementable without any multiplication or division, and more-over, it can be computed using a fast algorithm to reduce the number of additions/subtractions from $N^2$ to $N \log N$. The 2D WHT is a straightforward extension of 1D WHT. It is separable and symmetric, and can be implemented as a sequence of row and column 1D WHT transforms in a fashion similar to that of the 2D DFT/FFT.

A new heterogeneous transform $H_p = PH$ is introduced by permuting WHT matrix H with a permutation matrix P. A transform by $H_p$ can be performed efficiently by first applying fast WHT and then permuting the result.

To calculate the output of a single linear layer in a transform domain, ordinary schemes first apply the transform to both the input feature maps and the filter kernels, then apply the inverse transform after element-wise multiplications. Given the input feature map x, spatial kernel w, binary-valued (±1) transform matrix H, and binary-valued inverse transform $H^{-1}$, the output Y can be computed using the formula:

$$Y = H^{-T}[[H^T \times H] \odot [H^T wH]]H^{-1} \tag{1}$$

where $\odot$ denotes the element-wise multiplication. Note that using sparse w does not result in sparse element-wise multiplications in the transform domain.

This disclosure proposes to train the network kernels directly in the transform domains by back-propagation given the transformed inputs. However, applying a transform to the entire activation feature map significantly increases the number of weights since the transform domain kernel size must match the transformed activation size. To avoid this, one can divide the activation into small overlapping patches and apply transforms to each patch. One can overlap patches to learn inter-patch dependency although it leads to more multiplications. A proper kernel size (i.e., transform size) needs to be chosen carefully to balance storage and computation requirements.

Figures 1, 2:
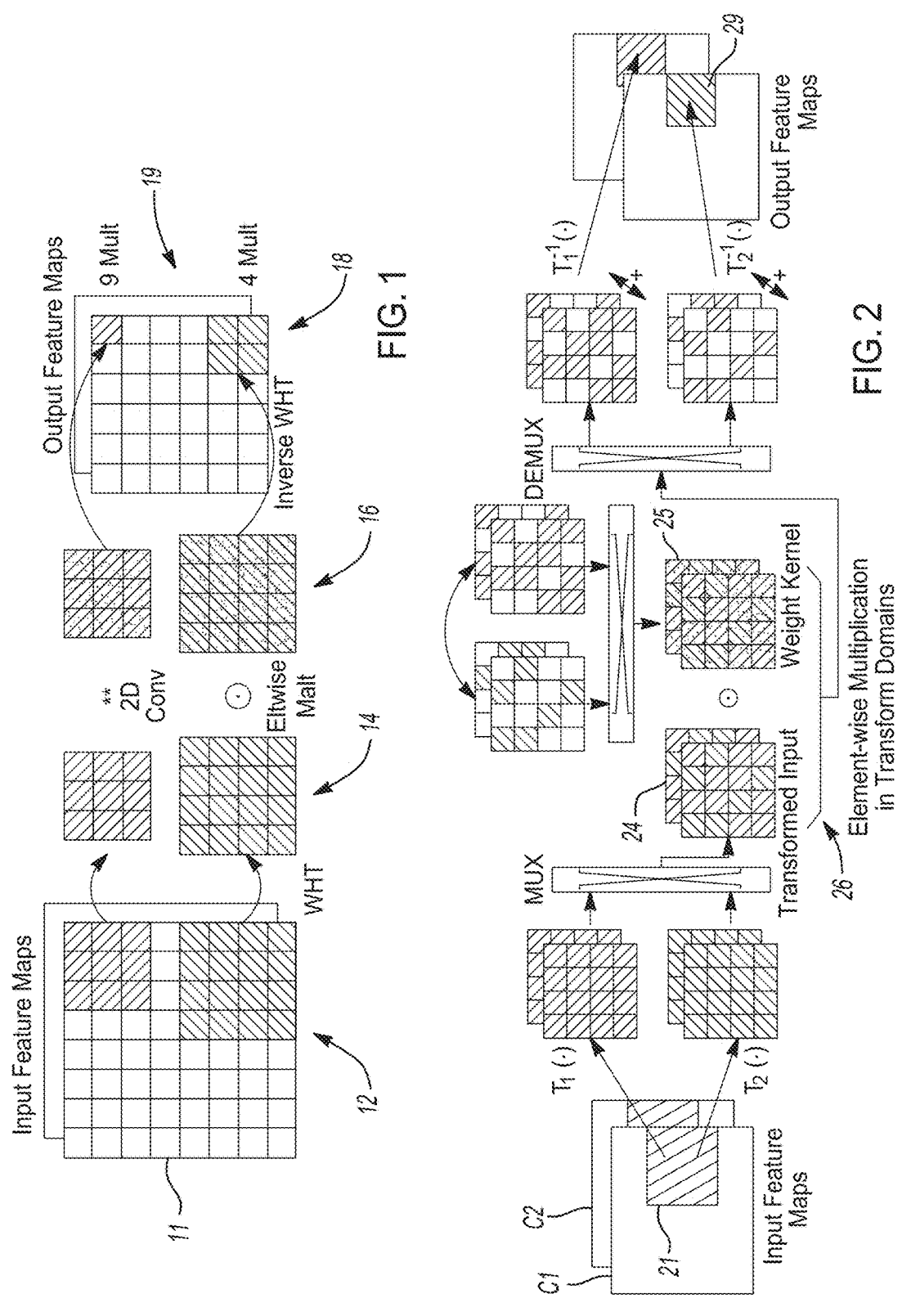
FIG. 1 depicts a comparison between a convolution layer and Walsh-Hadamard transform domain linear layer.
FIG. 2 depicts a linear layer of a heterogeneous transform neural network (HTNN) using sparse-orthogonal kernels in heterogeneous transform domains.

FIG. 1 illustrates a comparison between the conventional computation and a proposed computation using a new heterogenous transform with the proposed computation further described below. As a starting point, a first input patch 12 of data is received, where the first input patch 12 is a matrix extracted from the input 11. In one embodiment, the input 11 is further defined as image data although other types of input data are contemplated by this disclosure.

In the example embodiment, a Walsh-Hadamard transform is applied to the input patch 12 to yield a transformed input patch 14 in a transformed domain. An element-wise multiplication is performed between the transformed input patch 14 and a kernel 16 of the neural network. An inverse Walsh-Hadamard transform is then applied to the element-wise product to yield an intermediate matrix (i.e., output Y).

For the output feature map 19 for a given layer of the neural network, a first output patch 18 is created from the intermediate matrix, where the size of the first output patch is smaller than the intermediate matrix. The first output patch is created by selecting inner most elements of the intermediate matrix. In an example embodiment, the size of the Walsh-Hadamard matrix (which is the same as the size of the input patch and the size of the transform domain kernels) is determined to be the closest power of two to the original kernel size in the neural network. For example, for original 3×3 and 5×5 kernels, select a 4×4 Walsh-Hadamard transform matrix since 4 is the closest power of two to 3 and 5. For original 7×7 and 11×11 kernels, select an 8×8 Walsh-Hadamard transform matrix since 8 is the closest power of two to 7 and 11. The stride for creating the output patch is preferably half the size of the Walsh-Hadamard transform matrix. For the case of the 4×4 WHT matrix, the stride is 2×2 such that the center 2×2 blocks of the intermediate matrix forms an output patch of size 2×2 as seen in FIG. 1. For the case of the 8×8 WHT matrix, the stride is 4×4 meaning the center 4×4 block of the intermediate matrix forms an output patch of size 4×4.

Although this approach is generalizable to replace convolution kernels of any size, 3×3 convolution layers are described in this disclosure. These small convolution kernels are most commonly used and take a large portion in the overall CNN computations. To avoid a large increase in the number of transform-domain weights, one can operate based on a 4×4 patch extracted with stride of 2×2 from the h×w activation feature map and apply 4×4 (permuted) WHT. The output patch size is 2×2 as it is obtained by taking the central 2×2 block after applying the inverse (permuted) WHT. For the inverse transform, the calculation of the output patch can be simplified by applying a 4×2 matrix A, which consists of the middle two columns of the inverse (permuted) WHT matrix. Denoting the input patch by x and the 4×4 transform domain kernel by K, the output patch D of 4×4 WHT layer can be obtained by:

$$D = A^T \left[ \left[ H_P^T x H_P \right] \odot K \right] A \tag{2}$$

Since WHT can be efficiently computed with additions/subtractions, the multiplications needed to compute one output is reduced from 9 to 4 in this approach. Finally, all the output patches are assembled into an h×w feature map for the next layer and the feature map is input to the next layer of neural network.

Compared to an equivalent CNN, the number of multiplications is reduced by 2.25× with WHT-domain linear layers. But there is still significant redundancy in the proposed HTNN models. One can further reduce the computation by eliminating the redundant connections. For example, this problem can be treated as a non-convex optimization problem with combinatorial constraints specifying the sparsity requirements. First, the sparsity learning problem is defined and then explained how it can be solved by an alternating direction method of multipliers (ADMM) method.

Learning sparse weights in an N-layer DNN can be expressed as the following optimization problem:

$$\underset{\{W_i\}}{min} f(\{W_i\}) \ \text{s.t.} \ W_i \in S_i, i = 1, \dots, N, \tag{3}$$

where $f(\bullet)$ denotes the total loss function of DNN, $W_i$ denotes the weights of $i_{th}$ layer, and $S_i$ is the desired sparse pattern set for ith layer. Since $S_1, \dots S_N$ are non-convex sets, it is difficult to solve this optimization problems directly. By introducing auxiliary variables $Z_i$, one can rewrite an equivalent problem by:

$$\underset{\{W_i\}}{min} f(\{W_i\}) + \sum_{i=1}^{N} g(Z_i) \ \text{s.t.} \ W_i = Z_i \tag{4}$$

where $g(Z_i)=0$ if $Z_i \in S_i$, otherwise $g(Z_i)=1$. The ADMM method solves the non-convex problem (4) by first decomposing it into two sub-problems (5) and (6), and then alternatively solving one using the solution of the other in iterative fashion. $W_i$ is the only optimization variable in (5) and it is fixed for (6) to solve the optimal $Z_i$ given $W_i$. Scalar p is the penalty parameter and $U_i$ is a scaled dual variable updated by $$U_i^{k+1} = U_i^k + W_i^{k+1} - Z_i^{k+1} k_{th}$$

iteration.

$$\underset{\{W_i\}}{min} f(\{W_i\}) + \sum_{i=1}^{N} \frac{\rho}{2} \left\| W_i - Z_i^k + U_i^k \right\|_F^2 \tag{5}$$

$$\underset{\{Z_i\}}{min} \sum_{i=1}^{N} g(Z_i) + \sum_{i=1}^{N} \frac{\rho}{2} \left\| W_i^{k+1} - Z_i + U_i^k \right\|_F^2 \tag{6}$$

FIG. 2 illustrates the proposed computation using the heterogenous transform on an input having two or more channels C1, C2. Without loss of generality, assume the input is multiple channels of 2D activation feature maps. Each input channel C1, C2 is processed in a patch-by-patch manner with overlaps between adjacent patches. That is, a first set of input patches is received by the layer, where each input patch in the first set of input patches corresponds to a different channel of the input and each input patch in the first set of input patches is extracted from same location in the input.

For each input patch in the first set of input patches, a given input patch 21 is processed in two or more transform domains to yield an intermediate matrix for each of the two or more transform domains. More specifically, a given input patch is processed in the two or more transform domains by applying a unique variant of the Walsh-Hadamard transform T1, T2 for each of the two or more transform domains to the given input patch 21, and then element-wise multiplication is performed as indicated at 26 between the transformed input patch 24 and a kernel 25 of the neural network.

Results obtained from the element-wise multiplication are summed together to form an intermediate matrix for each transform domain. For each transform domain, an inverse Walsh-Hadamard transform is applied to the summed intermediate matrix. Similar to input side, a unique variant of the inverse Walsh-Hadamard transform $T1^{-1}$, $T2^{-1}$ is applied in each of the two or more domains. A first output patch 29 is created from each the transformed intermediate matrices in a similar manner as described above. Another set of input patches is received from the input and the process is repeated until the entire input has been processed by the layer. For ease of understanding, two transform domains are shown in FIG. 2 although more transform domains are envisioned by this disclosure.

To reduce the number of weights and computations in this procedure, one can impose an elaborate sparsity constraint $S_i$ on kernel weights of $i_{th}$ layer. That is, the non-zero positions of the weights in kernels belonging to different transform domains are sparse and strictly non-overlapping (i.e., orthogonal) as shown in FIG. 2. This sparse-orthogonality constraint allows an efficient hardware accelerator architecture where an array of multipliers performs parallel element-wise multiplications concurrently serving multiple channels with simple multiplexer (MUX)/de-multiplexer (DEMUX) logic at the input/output of the multiplier array as shown in FIG. 2. Sparse convolution does not have the same merit of this proposed sparse-orthogonal transform domain kernel computation.

To preserve the DNN accuracy while achieving a high pruning rate, heterogeneous transforms with different permutations ($H_{p1}$, $H_{p2}$, . . . ) are used, thus the position of important features in one transform domain is less likely to overlap with the ones in other transform domains. In this way, kernels associated with different transforms can (be trained to) have minimal impact on the other kernels when the sparse-orthogonality constraint is imposed. To find preferred kernel grouping, first train the transform domain layers without a sparse-orthogonality constraint or grouping. Then calculate cross-correlations between kernel weights and select groups that have low cross-correlation as they tend to have less overlapping on critical weight positions.

A new structured sparsity constraint is described for the number representation to further reduce the computation complexity of HTNN executed on hardware accelerators.

Canonical-signed-digit (CSD) representation is a special way of encoding a value using ternary {1, −1, 0} digits in which the number of nonzero digits is minimized. For example, an integer 30 requires 4 non-zero digits (bits) in the conventional binary representation (011110) while it only needs 2 non-zero digits in the CSD form of (1, 0, 0, 0, −1, 0) since $30=32-2=2^5 \times 2^1$ holds. The number of non-zero digits in CSD can vary depending on the number but it is always no more than what conventional binary representation needs. Since multiplying a number x by a power of 2 can be obtained by bit-shifting x (with much lower complexity than multiplication), fewer number of non-zero digits in the multiplicand translates to fewer shift and addition operations. To increase the benefit of this CSD representation, ontale can impose an additional sparse digit constraint to limit the number of non-zero digits to be strictly less than or equal to a predefined parameter k. Using k=2 and 8-bit (digit) weights, for example, a fixed-point weight w has a form of:

$$w=c \cdot 2^a+d \cdot 2^b a,b \in \{0,1, \ldots ,7\}c,d \in \{1,-1,0\}. \qquad (7)$$

Consequently, fixed-point multiplication x×w can be obtained by ((cx)<<a)+((dx)>>b) where x<<a denotes bit-shifting x by a bits. Note that in this example, multiplication is replaced by a single addition/subtraction of bit-shifted versions of x because c, d∈{1, −1, 0}. The complexity reduction factor of this technique with k=2 compared to conventional fixed-point multiplication is determined by the relative complexity of a multiplier vs. adder & shifting. Note that there is no memory overhead to store CSD numbers because they can be stored in the two's complement form using only Q-bits. After reading weights from the memory, a simple decoder logic can on-the-fly convert two's complement weights back to k-sparse CSD format.

Imposing k-digit sparsity on the CSD representation requires DNN training with non-uniform quantization. In the ADMM based back-propagation, we first enumerate all possible k-digit sparse CSD numbers and then apply projection of unquantized numbers to the nearest valid k-digit sparse CSD values during ADMM optimization (4). Thus, k-digit sparse CSD quantization is jointly applied with the learning of sparse-orthogonal weights described above.

Figure 3:
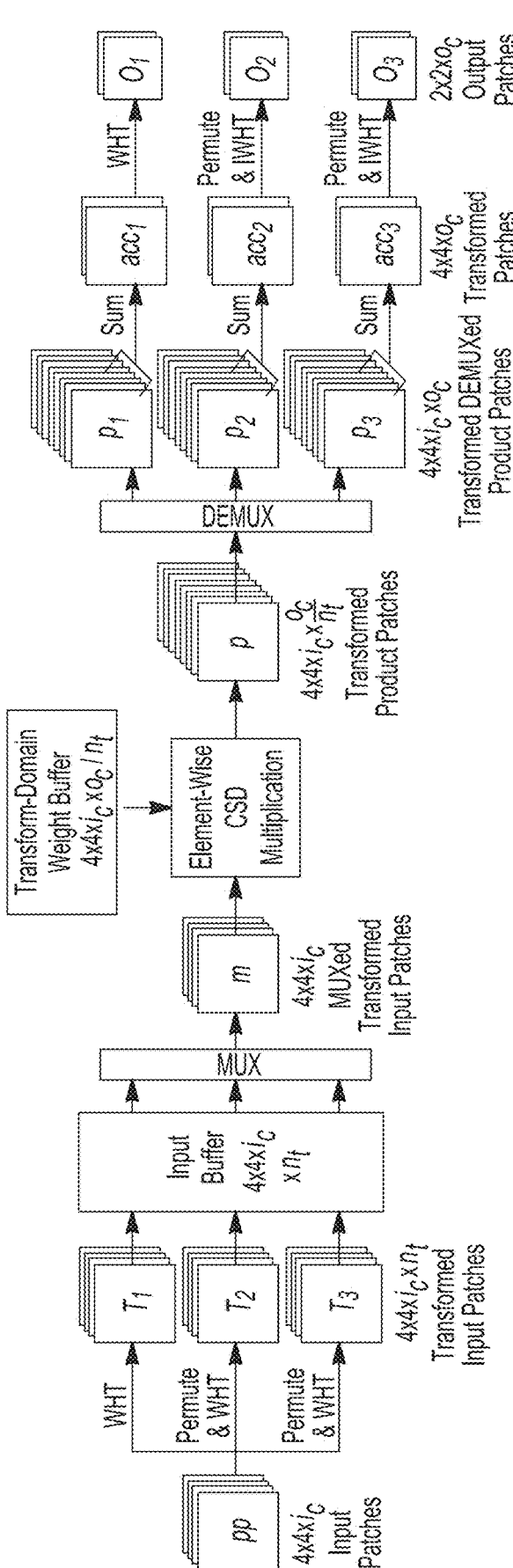
FIG. 3 depicts a single outer loop iteration of the heterogeneous transform neural network.

The overall data-path of the algorithm is depicted in FIG. 3. Use $i_c$, $o_c$, n, and $n_t$ to denote the number of input activation feature map channels, number of output channels, input/output 2D feature map size per dimension, and number of heterogeneous transforms employed in HTNN, respectively. The $i_c \times o_c$ orthogonal-sparse kernels of size 4×4 are trained offline and then merged/muxed to $i_c \times o_c/n_t$ 'dense' kernels stored in the transform-domain weight buffer shown in FIG. 3. For each input patch of size 4×4, the total number of transform computations required is $n_t$, not $o_c$, while $o_c >> n_t$ typically holds. Each transformed input patch can be used $o_c$ times. Hence the overhead of input transform is negligible when $o_c >> n_t$ holds. The element-wise CSD multiplication effectively processes $n_t$ sparse-orthogonal kernels and corresponding transformed input patches at the same time because they are merged before element-wise multiplications. The output is then demuxed to $n_t$ output channels and each is accumulated across input channel indices. The final accumulation is transformed to a 2×2 output patch. This process repeats for remaining patch locations. Note that the number of inverse transforms per patch is the same as $o_c$, regardless of $i_c$ or $n_t$. As the number of kernels ($i_c \times o_c$) increases, the overhead of inverse transform diminishes.

Table I found in the appendix below lists the number of additions and multiplications involved in an HTNN linear layer (4×4 kernel) and a sparse CNN convolutional layer (3×3 kernel) with non-zero weight density of d. The average density of HTNN kernels is $1/n_t$. A 4×4 2-D fast WHT requires 8×8=64 adders/subtractors. The inverse transform to produce each 2×2 patch requires 6×6=36 adders/subtractors.

Figure 4:
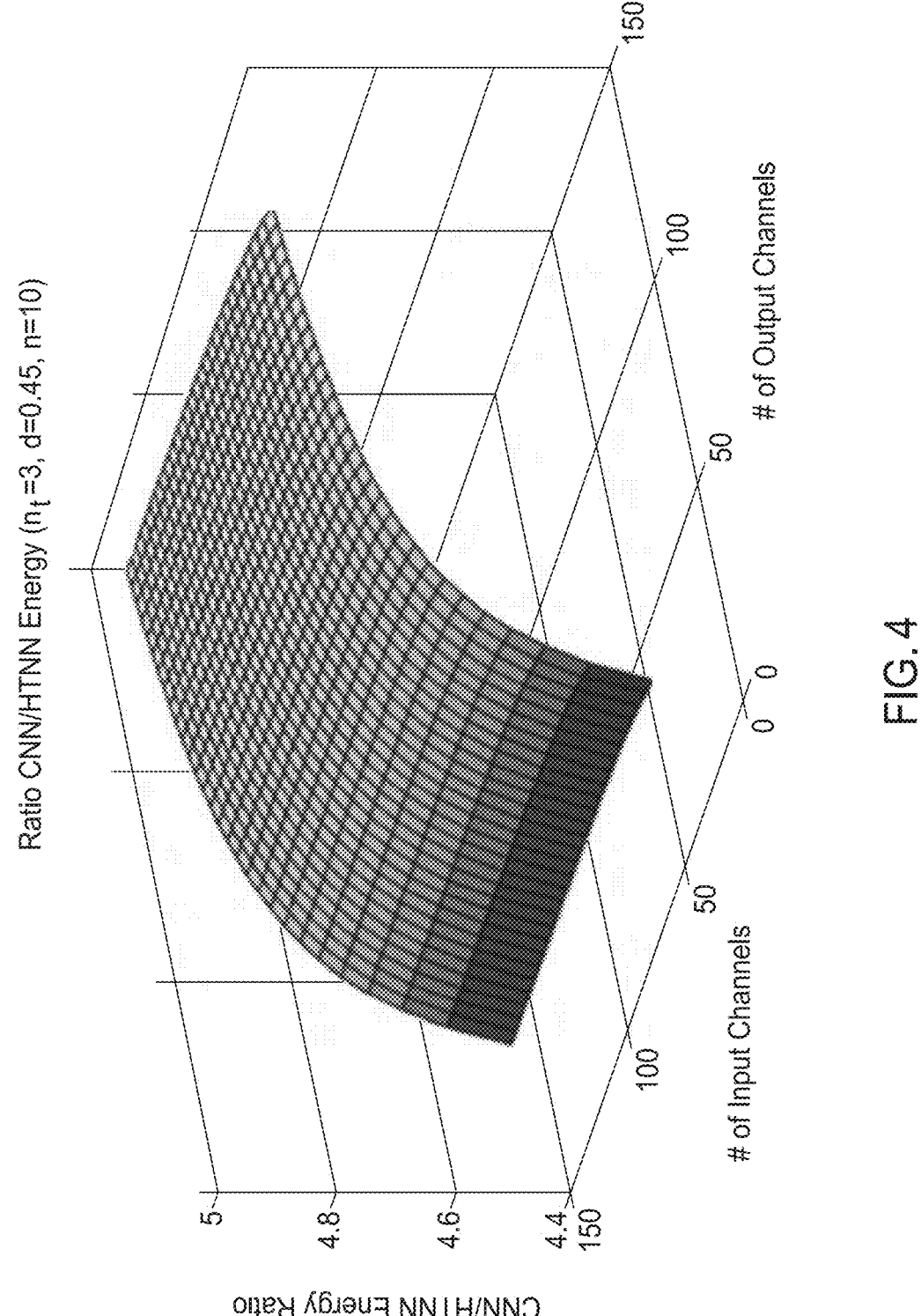
FIG. 4 illustrates the estimated energy ratio between a sparse convolutional neural network and a heterogeneous transform neural network.

To compare the estimated energy consumption of HTNN and sparse CNN, assume 8-bit quantization of activations and weights. The HTNN uses 8-bit CSD multiplication with k=2 digit sparsity. Convolutions in CNN involve 8-bit fixed-point multiplications. Accumulations of outputs in both CNN and HTNN are performed with 16-bit additions. Estimated energy consumption of the aforementioned fixed-point additions and multiplications are obtained from circuit synthesis and post-APR SPICE simulation results in a 40 nm CMOS process. It is observed that sparse CSD multiplication has ≈2× lower energy consumption compared to conventional fixed-point multiplication (0.181 pJ for CSD vs. 0.353 pJ for regular mult). FIG. 4 shows the estimated energy ratio (using Table I and assuming ideal HTNN/sparse-CNN hardware accelerators) between sparse CNN and HTNN for different $i_c$ and $o_c$ with fixed density d=0.45, $n_t$=3, and n=10. The energy efficiency gain of HTNN over sparse CNN is more evident (about 5× for this setting) when the layer involves a large number of channels ($i_c$ and/or $o_c$). It is worth noting that this analysis is based on ideal hardware accelerator assumption that only accounts for the number of operations related to nonzero weights in the sparse CNN, and ignores the substantial overhead of managing sparse convolutions. The advantage of HTNN that allows a simple mux/demux structure with less hardware overhead to efficiently merge sparse-orthogonal kernels is not captured in FIG. 4.

The proposed HTNN is tested with several famous CNN architectures on different datasets. To ensure that most convolution layers are replaced by transform-domain linear layers, CNNs that heavily use 3×3 convolution kernels are chosen. In HTNN versions, all 3×3 convolution layers are replaced by 4×4 HTNN linear layers. The architectures evaluated are: ResNet-20 described by He et al in "Deep residual learning for image recognition" in CVPR, 2016; a lightweight VGGNet VGG-nagadomi described by Nagadomi in "Code for Kaggle-cifar10 competition" https://github.com/nagadomi/kaggle-cifar10-torch7, and a general convolution-pooling model ConvPool-CNN-C described by Springenberg et al in "Striving for simplicity: the all convolutional net" in ICLR Workshop, 2015. The CIFAR-10 dataset is used to test ResNet-20 and VGG-nagadomi and the CIFAR-100 dataset is used to test ConvPool-CNN-C. To replace all 3×3 convolution layers with transform-domain linear layers, modification are made to the original ResNet- 20 architectures to use stride-1 convolution layers followed by 2×2 max-pooling instead of stride-2 convolution. The Pytorch framework is used in all experiments.

Three models are trained for each DNN architecture: conventional CNN, HTNN with a single WHT transform, and HTNN with multiple (permuted) WHT transforms. Two heterogeneous transforms ($n_t$=2) are applied to VGG-naga-domi whereas three transforms are used ($n_t$=3) for ResNet-20 and ConvPool-CNN-C. The proposed HTNNs can achieve similar test accuracy compared to spatial domain CNNs of all three network architectures. To compare computational complexity, obtain the total number of operations (OPs) on all 3×3 convolution layers and 4×4 HTNN layers including the overhead of transforms.

For learning the sparse-orthogonal kernels, the proposed method is applied to all WHT-domain HTNN models. Since the first WHT-domain layer is most sensitive to weight density, only allow one multiplier to be shared by two kernels ($n_t$=2). For the rest layers, let two kernels share one multiplier in VGG-nagadomi models, and three kernels share one in ResNet-20 and ConvPool-CNN-C models ($n_t$=3). For sparse CNN baselines, apply the deep compression strategy. Sparse-Winograd pruning results on VGG-nagadomi and ConvPool-CNN-C models are also added for comparison.

One observes around 0.8% accuracy drop from single-WHT models while almost no accuracy drop from multi-WHT models after applying the proposed method. It confirms using multiple heterogeneous transforms is beneficial to successfully learn the desired sparse-orthogonal kernel structures avoiding collisions on important non-zero weight positions. Besides, the proposed strategy on HTNN models achieve comparable compression ratios with CNN deep compression pruning. k=2 sparse CSD quantization was tested on all three HTNN models. It does not incur accuracy loss compared to learned sparse kernel models with Q=6. One observes plenty of near-zero weights are converted to zeros during the CSD quantization process, thus significantly lowering the non-zero weight density (Table II bottom results).

To compare the final computation complexity of the CNN models and transform domain HTNN models, apply uniform quantization to the spatial CNNs pruned with deep compression. All activations are quantized to 8 bits for HTNN and CNN (w/Winograd). Estimated energies for 8- & 16-bit addition, 8-bit multiplication and 8-bit CSD multiplication are 0.014, 0.070, 0.353 and 0.181 pJ respectively, in a 40 nm CMOS process (from post-APR SPICE simulations). For 3×3 convolution layers, HTNNs (including transform overhead) can achieve 4.9-6.8× complexity (energy) reduction compared to quantized sparse spatial CNN models with almost no accuracy drop on the validation datasets. In this comparison, no benefit is included from simplified hardware to handle sparse-orthogonal kernels in HTNN although the overhead of implementing sparse convolution is known to be substantial for CNN. The energy estimation of Sparse-Winograd VGG-nagadomi and ConvPool-CNN-C models with 6-bit uniform quantized weights, which yields 1.9-5.2 higher energy as compared to the HTNN models employing k=2; Q=6 CSD quantization.

Although CNN accelerator dataflows have been extensively studied, those dataflows are not directly transferable to the context of heterogeneous WHT-domain convolution with sparse-orthogonal kernels. Since memory access tends to dominate the energy efficiency of DNN hardware accelerators, the choice of transform-domain convolution dataflow was studied. Let the input feature map, output feature map, and weight kernels be of size $N×N×I_c$, $N×N×O_c$, and $O_c×I_c×4×4$, respectively. When the HTNN layer uses $n_t$ transform domains, its computation loops over three parameters: patch position p, orthogonal output channels $$\frac{OC}{n_t}$$

($n_t$ orthogonal channels are computed together), and input channels $I_c$. For a candidate architecture, the memory sizes as well as the number of memory accesses along the datapath will depend on the order in which input and output channels are processed.

Figure 5A:
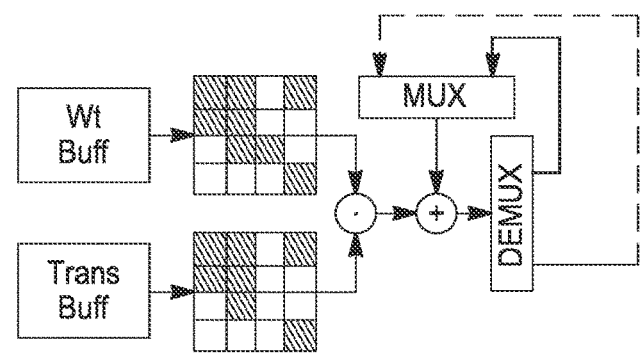
FIGS. 5A-5C illustrate three candidate transform domain convolution dataflows.
Figure 5B:
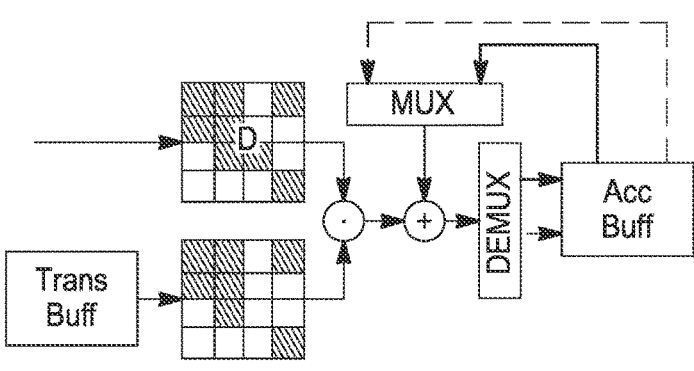
Figure 5C:
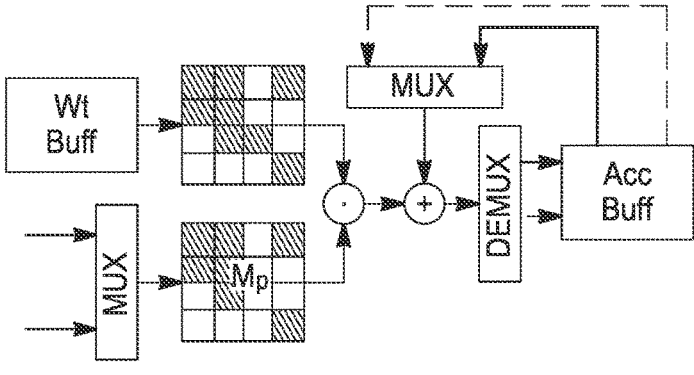

FIGS. 5A-5C illustrate three candidate transform-domain convolution dataflows corresponding to different re-orderings of the loops. In FIG. 5A, the first dataflow is referred to as output stationary. In this dataflow, the input is processed by applying $n_t$ transforms to each input channel patch at a given position. These transformed patches are then reused by multiple weight kernels. As a result, transformed patches need to be stored in a buffer. Weight kernels are also reused across different patch positions which suggests the need for a weight buffer. However, output product patches are accumulated along the input channels and as a result this accumulation can be done locally at the processing element (PE) level. In FIG. 5B, the second dataflow is referred to as weight stationary. The kernel weight is fixed at the PE level. The input is processed by applying $n_t$ transforms to all patch positions in a single input channel. These transformed patches are reused by multiple kernels. As a result, transformed patches need to be stored in a buffer. However, accumulation cannot be done locally at the PE level in this dataflow. A buffer is needed to perform read-modify-write operations to produce the output product patches for all patch positions. Finally, the third dataflow is referred to as input stationary. The input is processed by applying $n_t$ transforms to a single patch position at a single input channel. Similar to the first dataflow, weight kernels are also reused across different patch positions which suggests the need for a weight buffer. Similar to the weight stationary dataflow, accumulation cannot be done locally at the PE level. A buffer is needed to store output product patches for different kernels but the buffer size is smaller than the one in the weight stationary dataflow.

To identify an energy efficient dataflow, a case study is performed on transform convolution layers of a reasonably small network, ResNet20. The buffer SRAM sizes as well as the number of read and write accesses are quantified in terms of generic layer parameters for the different candidate dataflows. Then a memory architecture is outlined, where each layer of the studied network has SRAM macros that are sized to fit its layer parameters without needing to tile. TSMC 28 nm memory compilers are used to obtain unit access energies for SRAM and register file (RF) macros. All off-chip memory accesses are excluded in the comparison as they are identical for all dataflows. Also local (PE-internal) register access are excluded as its contribution is negligible relative to the contribution of SRAM and RF macro access energy.

Figure 6:
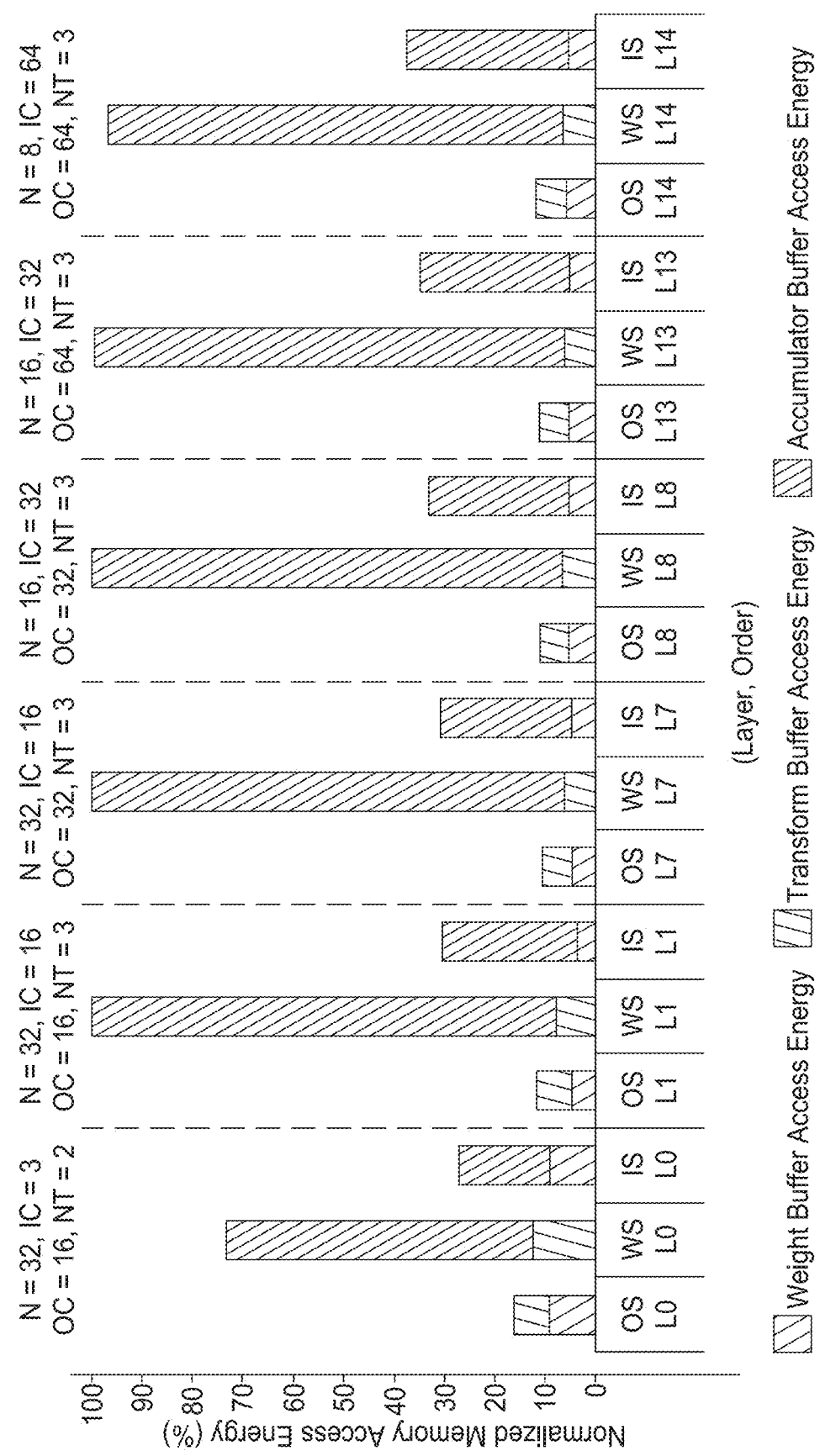
FIG. 6 is a graph showing normalized memory access energy comparison for ResNet20 case study against HTNN loop dataflow.

The tradeoffs shown in FIG. 6 in terms of memory access energy cost for each dataflow indicate that the output stationary dataflow is the most energy efficient for transform-domain convolution. Although a similar observation was made for the conventional CNN dataflow, it is not straightforward to arrive at the same conclusion because the internal dataflow of transform-domain convolution that involves element-wise multiplications for the concurrent processing of $n_t$ sparse-orthogonal kernels is dissimilar to that of ordinary CNNs. Weight and input stationary dataflows are primarily less energy efficient for transform-domain convolution because they suffer from a large amount of read-modify-writes that heavily contribute to the energy cost while accumulations can be done locally at the PE level in the output stationary dataflow. Output stationary benefits from the fact that the bandwidth of the transform buffer is less than that of the accumulator buffer because only $$\frac{1}{n_t}$$

of the transformed patches are used in a given cycle to concurrently compute $n_t$ output channels. Despite the write bandwidth of the transform buffer being larger than that of the accumulator buffer, the transform buffer is written to less frequently since the transformed patches are re-used for multiple weight kernels. To fully take advantage of these observations, the proposed output stationary dataflow requires an efficient memory organization scheme for accessing the transform buffer, which will be discussed below.

Figure 7:
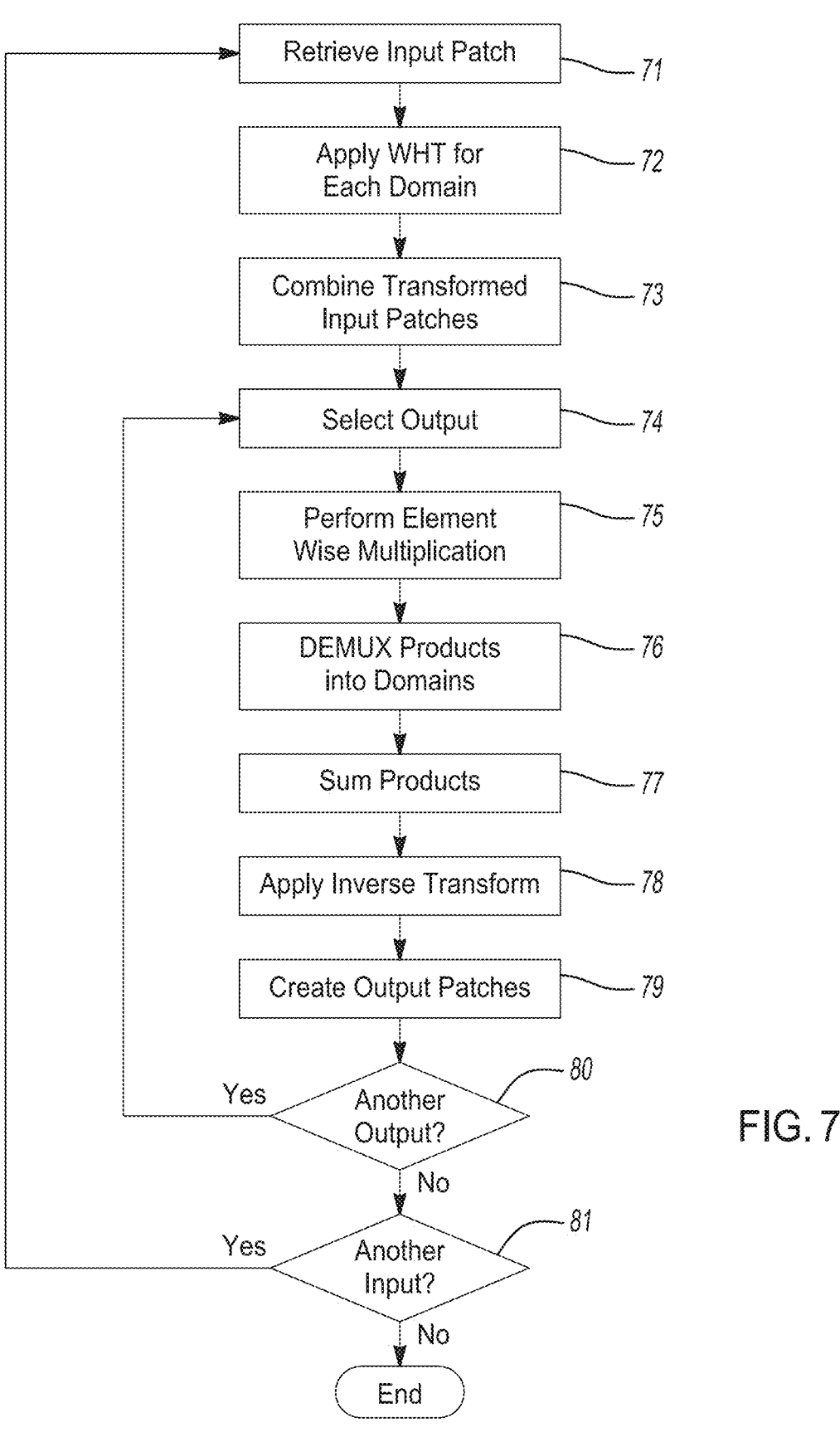
FIG. 7 is a flowchart depicting an example embodiment of the output stationary dataflow.

An example embodiment of the output stationary dataflow is further described in relation to FIG. 7. An input patch of data is retrieved at 71 from an input feature map. The input patch is preferably processed in two or more transform domains to yield a transformed input matrix. More specifically, for each of the two or more transform domains, a unique variant of the Walsh-Hadamard transform is applied at 72 to the input patch to yield a transformed input patch in each of the two or more transform domains. The transformed input patches are then combined at 73 to form the transformed input matrix. The transformed input patches are overlapped (i.e., combined) such that the overlapped pattern matches the overlapping patterns of the orthogonal kernels. The transformed input patches for the two or more transform domains are preferably stored in a transform memory of a computing device.

Next, a given output channel, o, is selected for processing at 74 from the plurality of output channels. For each input channel, i, in the plurality of input channels, an element-wise multiplication is performed at 75 of the transformed input matrix and a given kernel to yield an intermediate matrix, where the given kernel (i,o) corresponds to the input channel and the given output channel. To improve processing efficiency, a plurality of kernels are stored in a buffer of a computing device. Each kernel in the buffer maps to a different combination of an input channel from the plurality of input channels and an output channel from the plurality of output channels. It is also noted that the kernels are trained such that positions of non-zero kernel weights are strictly non-overlapping across the two or more transform domains in the manner described above.

Once the element-wise multiplication has been performed for each of the input channels, the product matrices are demultiplexed into a set of product matrices for each of the two or more transform domains as indicated at 76. For each of the two or more transform domains, the intermediate matrices in a given domain together are summed together at 77 and an inverse Walsh-Hadamard transform is applied at 78 to the summed intermediate matrix. Lastly, an output patch is created at 79 from the inverse transformed and summed intermediate matrix.

Following the processing of the given output channel, another output channel is selected and processed as indicated at 80 until each output channel in the plurality of output channels has been processed. Because the output patch is accumulated across all of the input channels, the accumulation can be done locally by the computer processor.

After the initial input patch is processed, another input patch is retrieved from the input and processed as indicated at 81 until all of the input patches from the input have been processed.

In this example embodiment, one input patch and one output channel are processed concurrently. It is envisioned that more than one input patch and more than one output channel can be processed concurrently the output stationary dataflow. For example, four input patches and three output channels may be processed concurrently using the arrangement for the transform memory described below.

Figure 8:
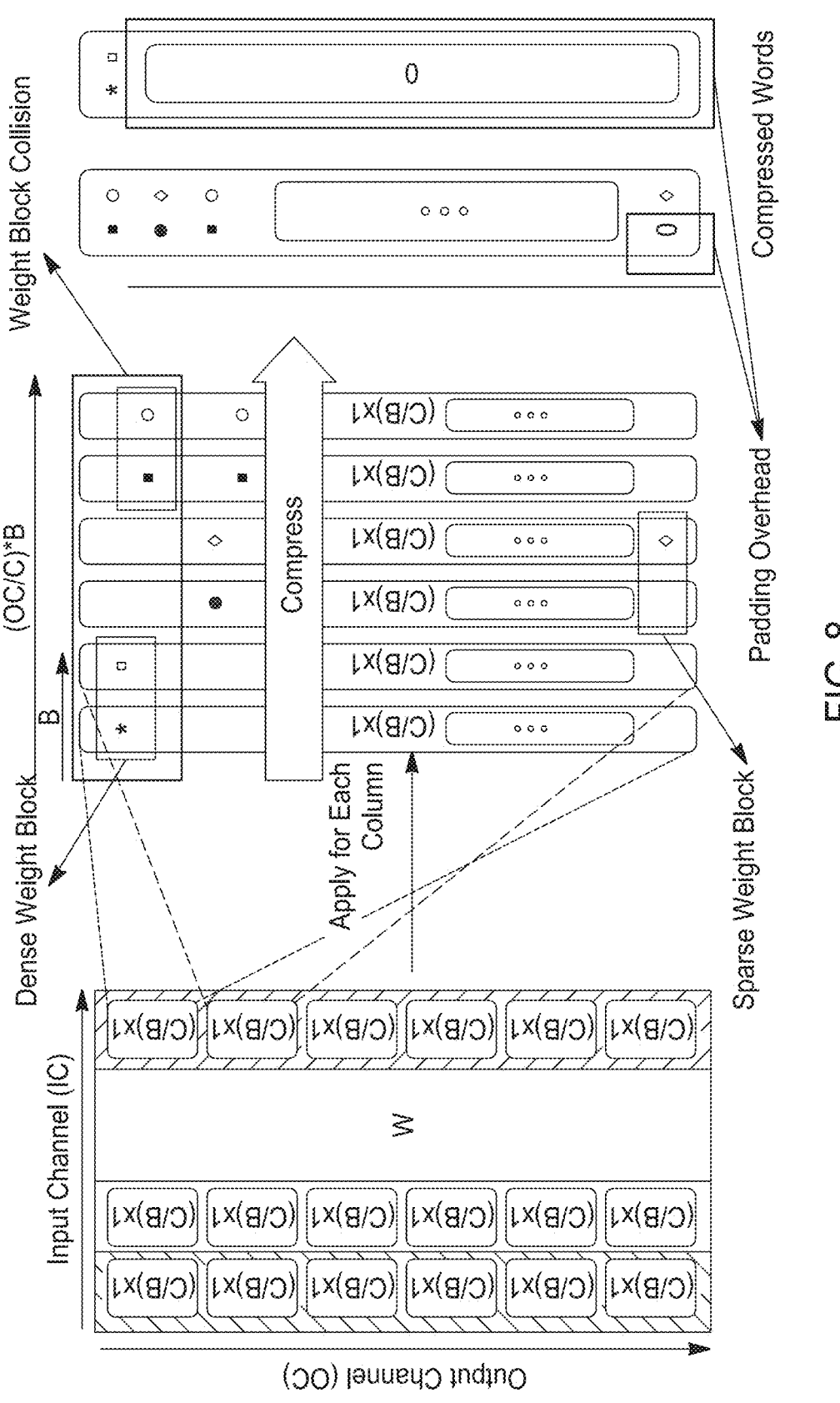
FIG. 8 is a diagram showing overhead of index-based encoding methods for fully-connected layer weight matrices with unstructured sparsity.

In order to fully exploit both weight and activation sparsity, an energy-efficient outer-product sparse FCL implementation based on an input stationary dataflow is explored. To motivate this proposed scheme, let one first consider a case where an index-based compression method is employed to represent the weight matrix W where the location of non-zero weight values are random (unstructured) as illustrated in FIG. 8. First divide the original column into equal sized chunks of size C/B and reshape the column into a C/B-row matrix, where C is the number of weights in a compressed word and B is the size of a weight block. Then to compress W (remove zeros) along its columns, weights are packed densely in the direction shown in FIG. 8. Each compressed word contains C/B blocks of weights (i.e., C weights per word). Each weight is associated with the column number that it originates from in the C/B-row matrix. Each weight's position in the compressed word corresponds to its position in the chunk. Despite being able to aggressively prune W, the lack of structure on the location of the zero weights could lead to collisions after reshaping the column. In the example of FIG. 8, the existence of weight block collisions means one may need to have an additional weight word just for one non-zero weight block. Also note the possible existence of non-dense (underutilized) weight blocks. In general, these collisions can be spread across the sparse weight matrix and translate to inefficient memory and multiply-and-accumulate (MAC) utilization.

To combat this inefficiency, a novel column-based-block (CBB) structured pruning is proposed for sparse fully connected layers that can be learned to minimize the overhead of zero padding. During neural network training, impose the following sparsity constraint on W. Given a target density d, prune the matrix such that the number of weight block collisions in each row of the reshaped column is the same. As a result, minimize the overall impact of zero padding and maximize the potential memory and multiply-and-accumulate (MAC) utilization. In order to verify whether CBB structured sparsity can achieve high sparsity ratio while maintaining inference accuracy, the feasibility of this approach on fully connected layers is tested on VGG-Nagadomi HTNN. With this scheme, train, prune, and quantize VGG-Nagadomi HTNN using 8-bit bit-spares canonical-signed digit (BS-CSD) representation in PyTorch with C=64, B=4, and d=6.25% and CIFAR-10 dataset. Experimental results show that the top-1 accuracy posttraining, post-pruning, and post-(BS-CSD) quantization are 92.29%, 92.74%, and 92.22%, respectively. This validates that CBB structured sparsity can be supplemented to the proposed HTNN training scheme without compromising the accuracy of the model. CBB structured sparsity can operate at different layer-dependent optimal target densities d (in the range of 6.25-50%) that do not degrade the DNN accuracy by controlling the number of collisions in each row of the reshaped columns of W during training. Parameters C and B are a function of the underlying hardware architecture configuration.

Figure 9:
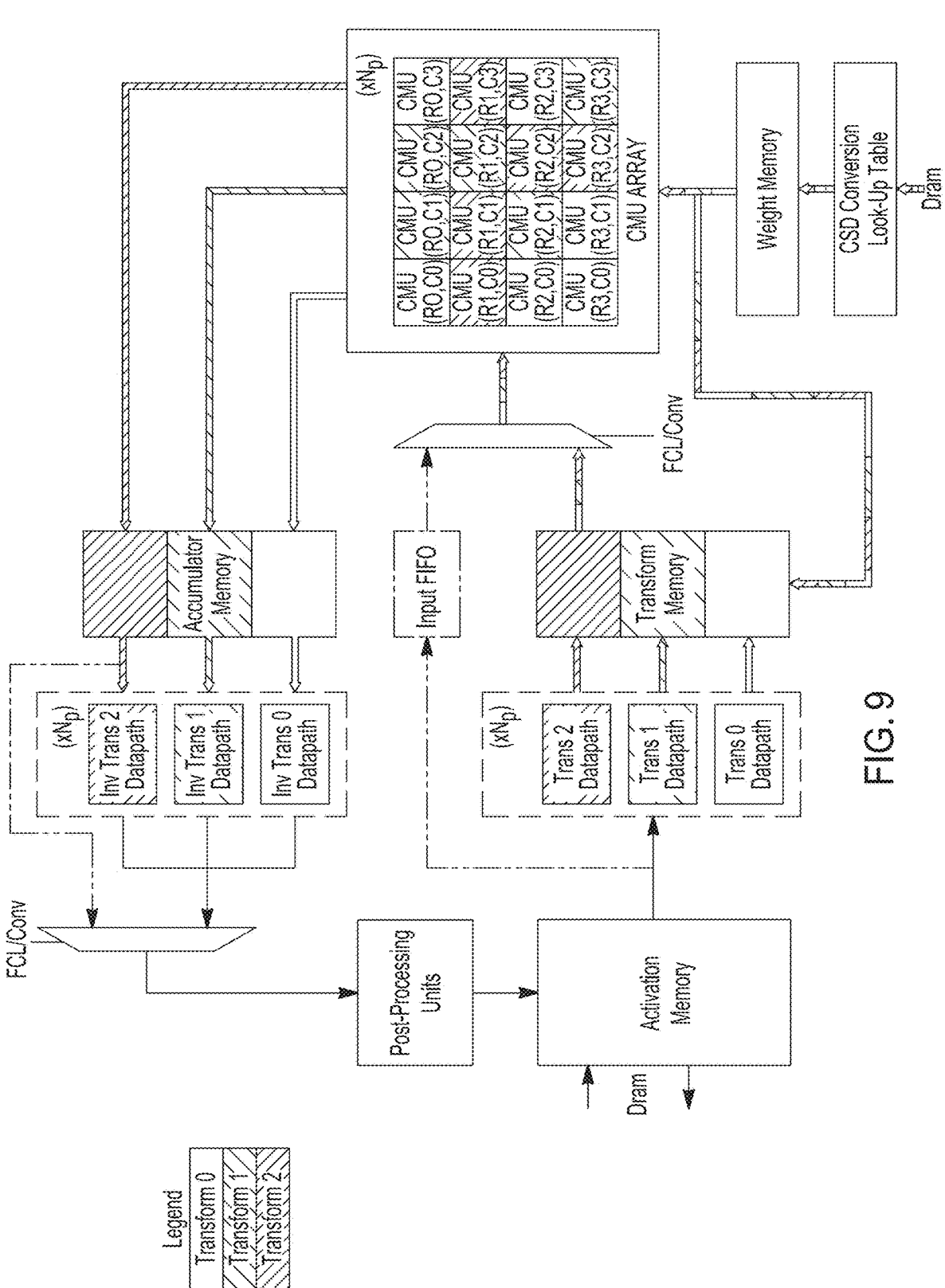
FIG. 9 is a diagram showing an overall architecture for processing WHT domain convolution.

FIG. 9 shows the proposed overall architecture (SONA) for processing WHT domain convolution and fully-connected layers using a unified datapath. All weights and activations are initially stored in off-chip DRAM before being loaded into weight and activation memories, respectively. Weights are converted into their BS-CSD representation before being loaded into weight memory. Details regarding the weight representation are discussed below. This proposed architecture makes use of a $4 \times 4 \times n_t$ BS-CSD-MAC unit (CMU) array and a $N_p \times n_t$ (inverse) transform datapath array to process NP patch positions in parallel using $n_t$ WHT variants.

The execution of a WHT domain convolution layer is illustrated in FIG. 9. Paths that are not active during transform convolution are greyed out. Different hatchings in FIG. 9 indicate $n_t = 3$ WHT variants with sparse-orthogonal weights that are processed concurrently. The nested-loop control of transform-domain convolution to sweep the patch position, output channels, and input channels follows the output stationary ordering. Once weights and input activations are loaded into their respective memories, an input channel tile of size I for $N_p$ $4 \times 4$ patches are sent to the transform array. The resulting $N_p \times n_t$ transformed $4 \times 4 \times I$ patches are stored in transform memory consisting of $4 \times 4 \times n_t$ banks of depth I and data width $N_p \times 8$ bits. Subsequently, the proposed architecture performs element-wise BS-CSD MAC operations in the CMU array. All $N_p$ activation $4 \times 4 \times I$ patches are multiplied by the same $4 \times 4 \times I$ kernel that merges $n_t$ sparse-orthogonal weights to concurrently compute $n_t$ output channels that are also coded in FIG. 9. Accumulation across the I channels is done locally at the CMU level (i.e., output stationary). Upon completing the accumulation for a tile, the following group of orthogonal output channels is processed in order to maximize the reuse of the transformed activations. In the case where the layer's number of input channels $I_c$ is larger than the tile size I, the intermediate result from the previous group of orthogonal output channels is stored in accumulator memory that consists of $4 \times 4 \times n_t$ banks of depth $$\frac{O_C}{n_t}$$

and data width $N_p \times 24$ bits.

After all the layer's weight kernels and input channels have been processed, $N_p$ accumulated $4 \times 4 \times O_c$ patches are sent to the inverse transform array and post-processing units (e.g., ReLU) while the next set of $N_p$ patches are transformed. The final $2 \times 2 \times O_c$ patches from inverse transform and postprocessing are written back to the activation memory.

N=8-bit input MAC units for BS-CSD weights that are non-uniformly quantized with 87 levels (at most 2 non-zero digits) are implemented. Activations are uniformly quantized with N=8-bit two's complement (non-CSD) representation. In order to take advantage of the bit-sparsity and non-uniform quantization when performing MAC operations, a hardware-friendly representation is required to represent non-zero weights. Given at most two non-zero CSD digits, which are referred to as bits a and b, encode the respective signs, $a_{sign}$ and $b_{sign}$, and positions, $a_{pos}$ and $b_{pos}$, of these bits in order to determine the operands of the final addition/subtraction. Without loss of generality, assume that $a_{pos} > b_{pos}(a_{pos} \in \{0, 1, \ldots, 7\}$ and $b_{pos} \in \{0, 1, \ldots, 5\})$ and encode the traditionally 8-bit weight values w using 9 bits in the form of $w = a_{sign} << a_{pos} + b_{sign} << b_{pos}$ where $<<$ denotes the arithmetic left shift operation.

Figure 10A:
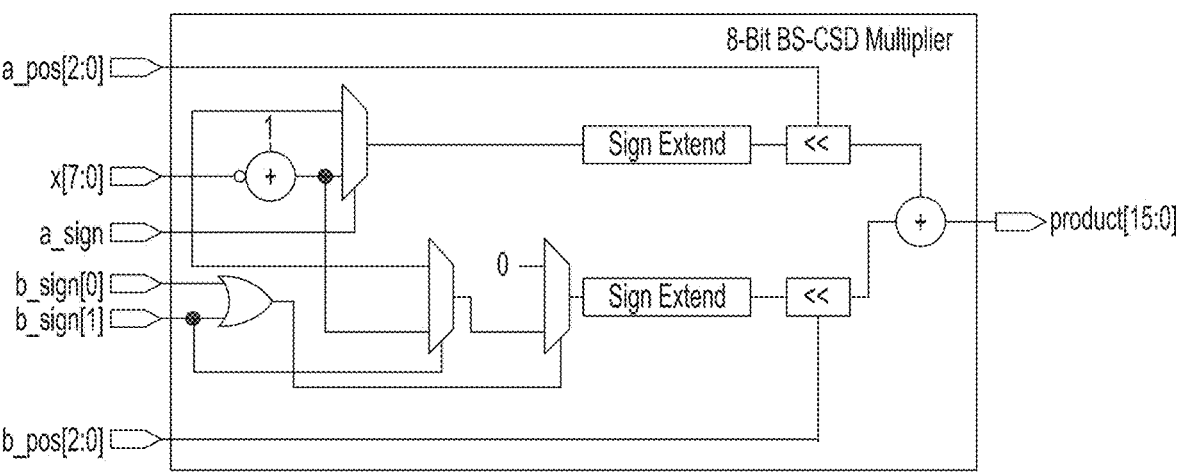
FIG. 10A is a schematic for an 8-bit BS-CSD multiplier.

The proposed weight representation stems from the observation that the CSD representation of a number does not contain two adjacent non-zero digits. Thus, the relationship between $a_{pos}$ and $b_{pos}$ actually becomes $a_{pos} > b_{pos} + 1$. One can also take advantage of the fact that there are 87 quantization levels to reduce the memory footprint in off-chip memory by storing each weight as a 7-bit code, which can be converted to the 9-bit representation using a look-up-table before storing it in weight memory. FIG. 10A shows an example circuit implementation for BS-CSD weight multiplication. Using the proposed representation, multiplication between an 8-bit activation and BS-CSD weight is replaced by two bit-shifting and a single 16-bit addition. Note how the final 16-bit adder at the end of the multiplier requires prior additional shifting and multiplexing logic to generate partial products based on the sign and position of each non-zero digit of the weight.

Figure 10B:
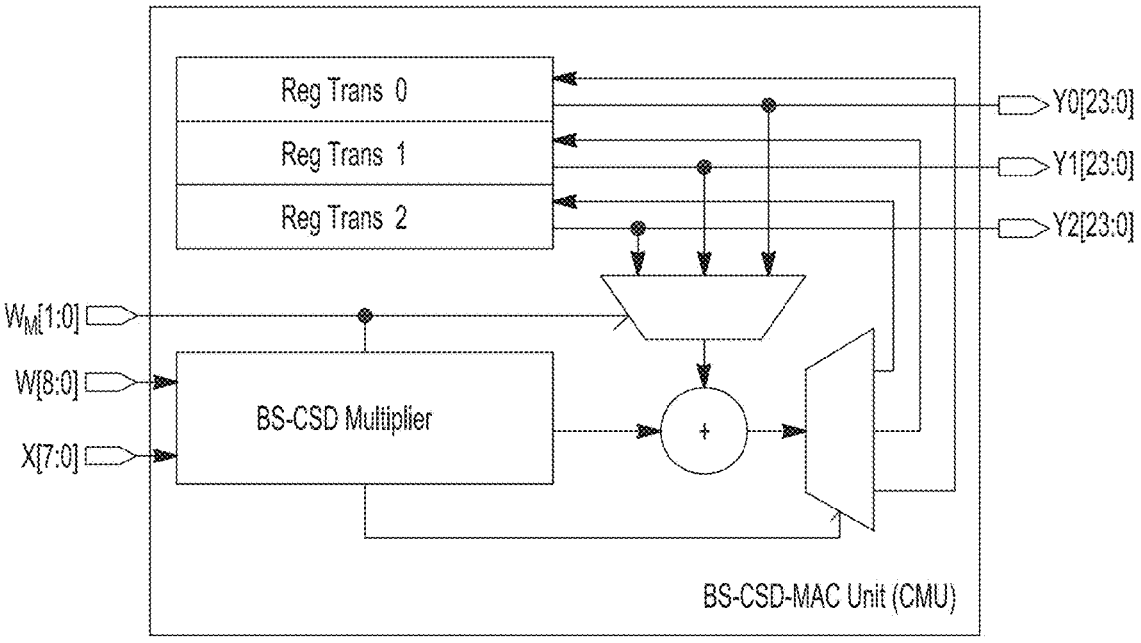
FIG. 10B is a schematic for a BS-CSD-MAC unit.

In the proposed architecture, employ $4 \times 4 \times N_p$ BS-CSD-MAC units (CMUs) shown in FIG. 10B to perform dense (after merging $n_t$ sparse-orthogonal weights) element-wise multiplications where NP is the number of patch positions processed in parallel. In a given cycle, each cycle performs at most one nonzero and $n_t - 1$ implicit zero MAC operations using a single 8-bit BS-CSD multiplier and a single 24-bit accumulation adder. The inputs to the unit are the 8-bit two's complement activation x, the 9-bit BS-CSD weight w and a 2-bit weight mask $w_m$ indicating the transform variant associated with w. Each weight is associated with a unique weight mask used to perform muxing/demuxing as the orthogonal overlapping pattern varies from channel to channel. The partial results are accumulated locally in registers that map to the concurrently computed $n_t$ output channels.

The reconfigurable transform datapaths need to handle different permuted variants of the 2D WHT, which are defined as $H_p = PH$ where P is the corresponding permutation matrix. A $4 \times 4$ 2D non-permuted fast WHT requires $8 \times 8 = 64$ adders/subtractors. The transform operation can be reordered and split into two back-to-back identical operations as in $$Y = H_P^T \times H_P = \left(\left(\left(X^T P\right) H\right)^T P\right) H.$$

Figure 11:
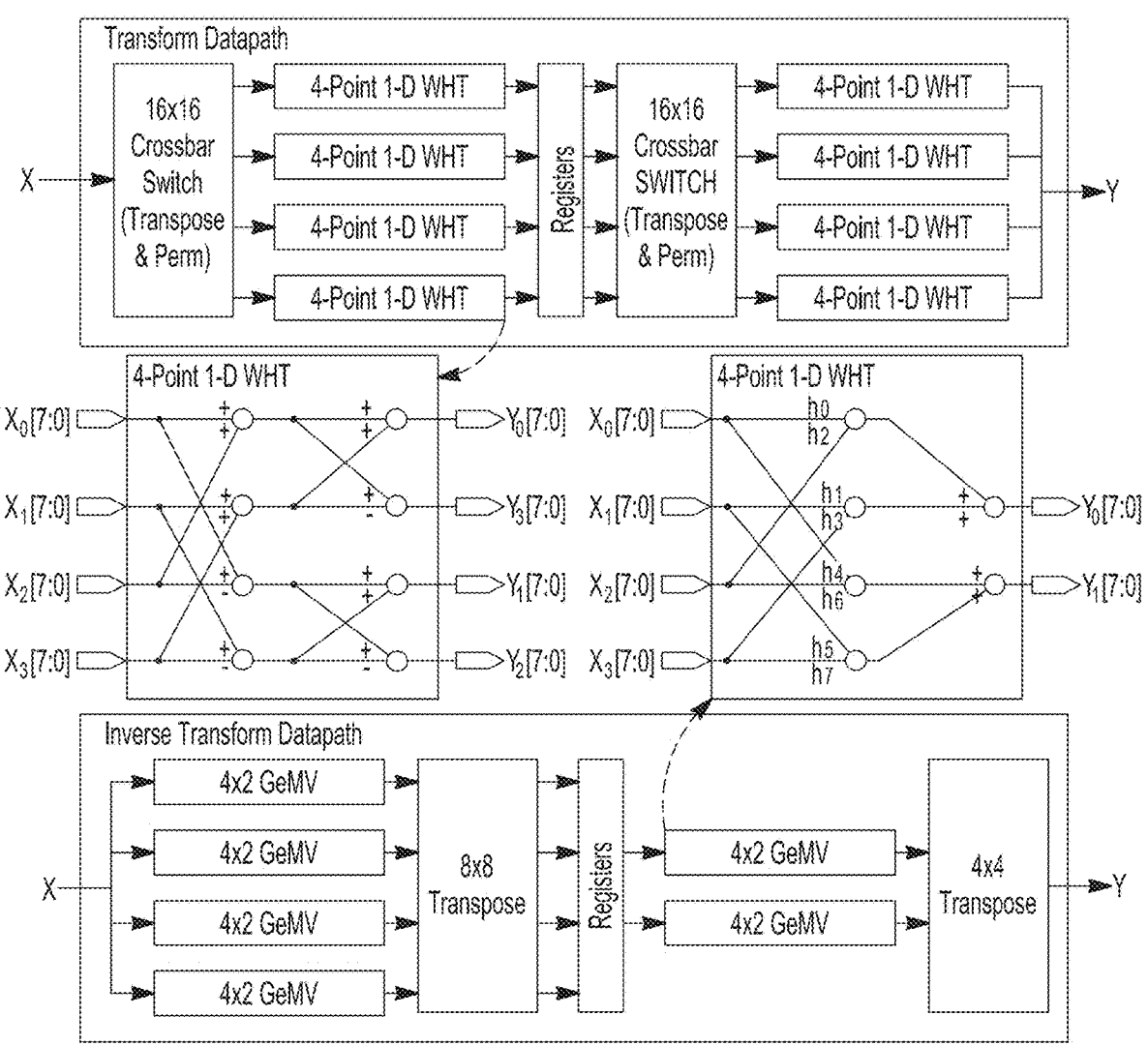
FIG. 11 is a diagram showing permuted (inverse) transform reconfigurable datapaths.

First, the $4 \times 4$ input patch X is transposed and permuted. A transform is then applied to each row of the intermediate result. The operation is repeated a second time to produce the final transformed patch Y. A diagram of the proposed transform datapath is shown in FIG. 11. The transpose and permutation operations are combined into a single $16 \times 16$ reconfigurable crossbar switch.

To implement the permuted variants of the inverse WHT operation as defined in $$Y = A_P^T \times A_P,$$

one might note that H is an orthogonal matrix and that we can reuse the WHT transform datapath in FIG. 11 (top) to compute the inverse WHT. However, this would be wasteful as one only needs the central 2×2 block from the resulting operation. The permuted inverse WHT variants ($A_P$) correspond to the binary-valued (±1) middle two columns of the $$H_P^{-1}$$

matrices.

Therefore, the inverse transform is implemented using reconfigurable 4×2 general matrix-vector (GeMV) multiplication blocks and transpose interconnect networks as shown in FIG. 8 (bottom). Each datapath requires 6×6=36 adders/subtractors. The proposed architecture employs $n_t \times N_P$ datapaths for each of the transform and inverse transform to process NP individual 4×4 patches using up to $n_t$ variants in parallel. Both transforms and inverse transforms datapaths are pipelined to ensure that these datapaths do not limit the performance of the overall architecture.

Overlap $n_t \leq 3$ orthogonal weight kernels prior to storing them in weight memory and associate with each weight a 2-bit mask to indicate its corresponding WHT variant. Input activation patches are transformed in all $n_t$ domains and re-used across the output channel dimension, but only $$\frac{1}{n_t}$$

are used during elementwise multiplications. It must be noted that the overlapping pattern is different from channel to channel within a single layer and it makes transformed patch reusing non-trivial. Therefore, it is critical to devise an energy-efficient transform memory organization which limits the access to only the required transformed patches in each cycle.

Figure 12:
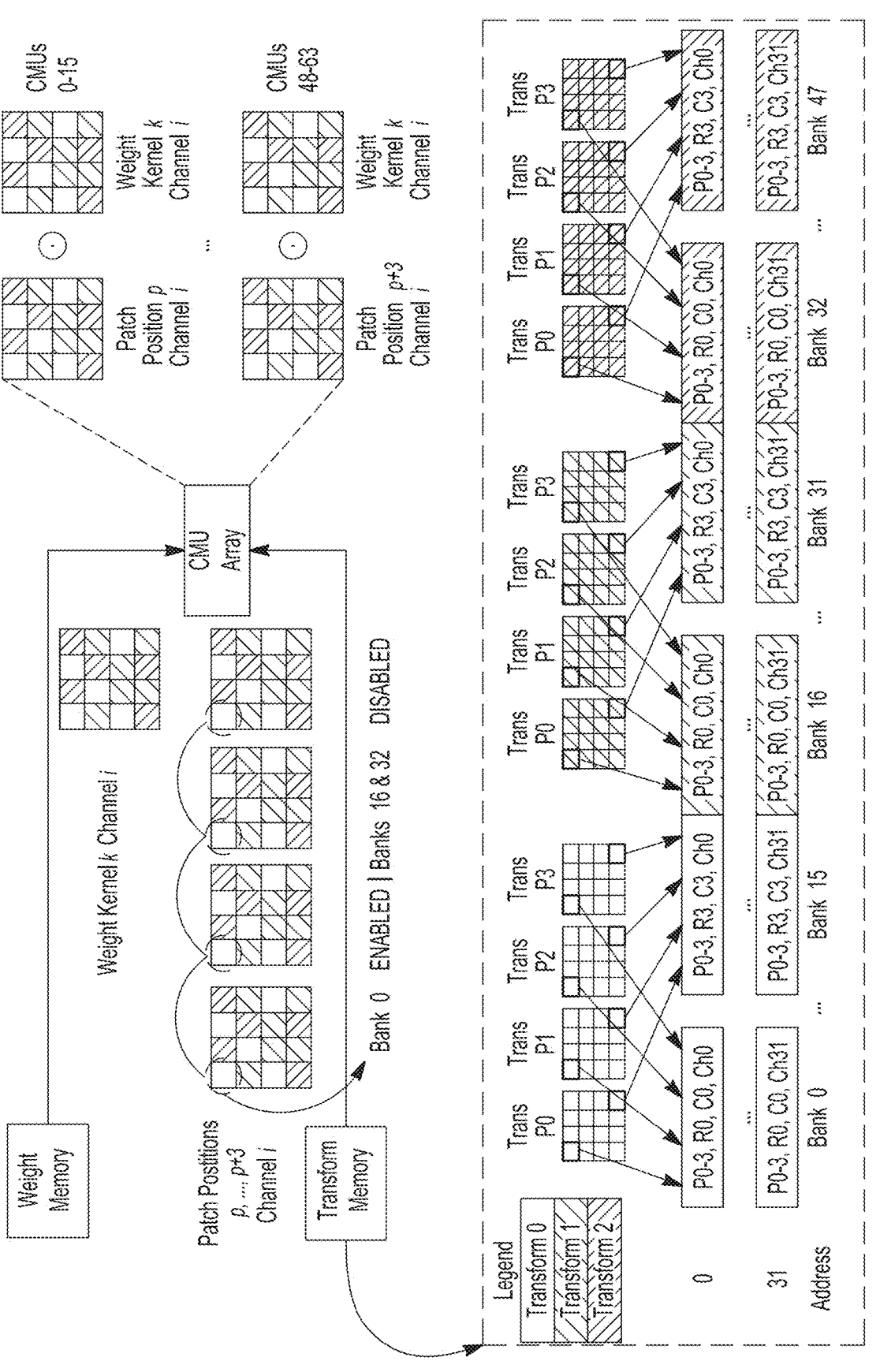
FIG. 12 is a diagram showing multiple activation single row (MASR) transform memory organization for mapping transform activations onto memory banks and words.

Assuming that one processes $N_p$ patches in parallel, the transform memory is expected to hold I×$N_p$ 8-bit transformed activation patches where I is the tile size for the number of input channels. The read and write bandwidths of this memory are 4×4×$N_p$ and 4×4×$N_p$×$n_t$, respectively. One approach would be to have $N_p$×$n_t$ banks of depth I and word width 4×4×8 bits. This approach is referred to as single patch single row (SPSR). Another approach would be to have $N_p$×$n_t$×4×4 banks of depth I and word width 8 bits. This approach is referred to as single activation single row (SASR). SASR provides more flexibility than SPSR in controlling which activations are read during a cycle. With SPSR, $n_t$×$N_p$ patches are read when only $N_p$ patches are needed. In other words, SASR helps limit the number of unnecessary memory accesses. However, SASR incurs a larger overhead for peripheral memory circuitry from employing many more smaller banks and therefore has the potential to be less area and energy efficient than SPSR. As a middle ground, this disclosure proposes a scheme referred to as multiple activation single row (MASR) illustrated in FIG. 12. MASR has $n_t$×4×4 banks of depth I and word width $N_p$×8 bits. This approach is chosen since the overlap pattern is solely dependent upon the kernel being processed and all $N_p$ patch positions are multiplied by the same kernel in a cycle using the output stationary dataflow. Therefore, when loading the transformed patches from transform memory, the weight mask can be used to disable $$\frac{n_{t-1}}{n_t}$$

of the banks and load only me $N_p$ overlapped transformed patches that are needed. In FIG. 12, MASR is illustrated for I=32, $N_p$=4, $n_t$=3. The top left weight of the loaded kernel is associated with variant 0 and all the activations of each transformed patch using transform variant 0 are in bank 0. To perform element-wise multiplication, enable that bank and disable the other two that contain the activations transformed using transform variants 1 and 2 at that location.

Experimental results using Arm memory compilers in TSMC 22 nm technology indicate that for I=32, MASR has {1.2×, 1.7×} and {1.6×, 2.4×} less access energy than SPSR and SASR, respectively, for NP={2, 4} at the cost of being {1.8×, 1.3×} less area efficient than SPSR. Note that SASR is overall the most flexible but least area efficient approach and it is not necessarily energy-efficient as the increased number of small memory banks incurs energy overhead to peripheral circuitry for memory banking. Thus, in order to exploit patch parallelism, MASR becomes necessary to maximize the energy efficiency of the design.

Figure 13:
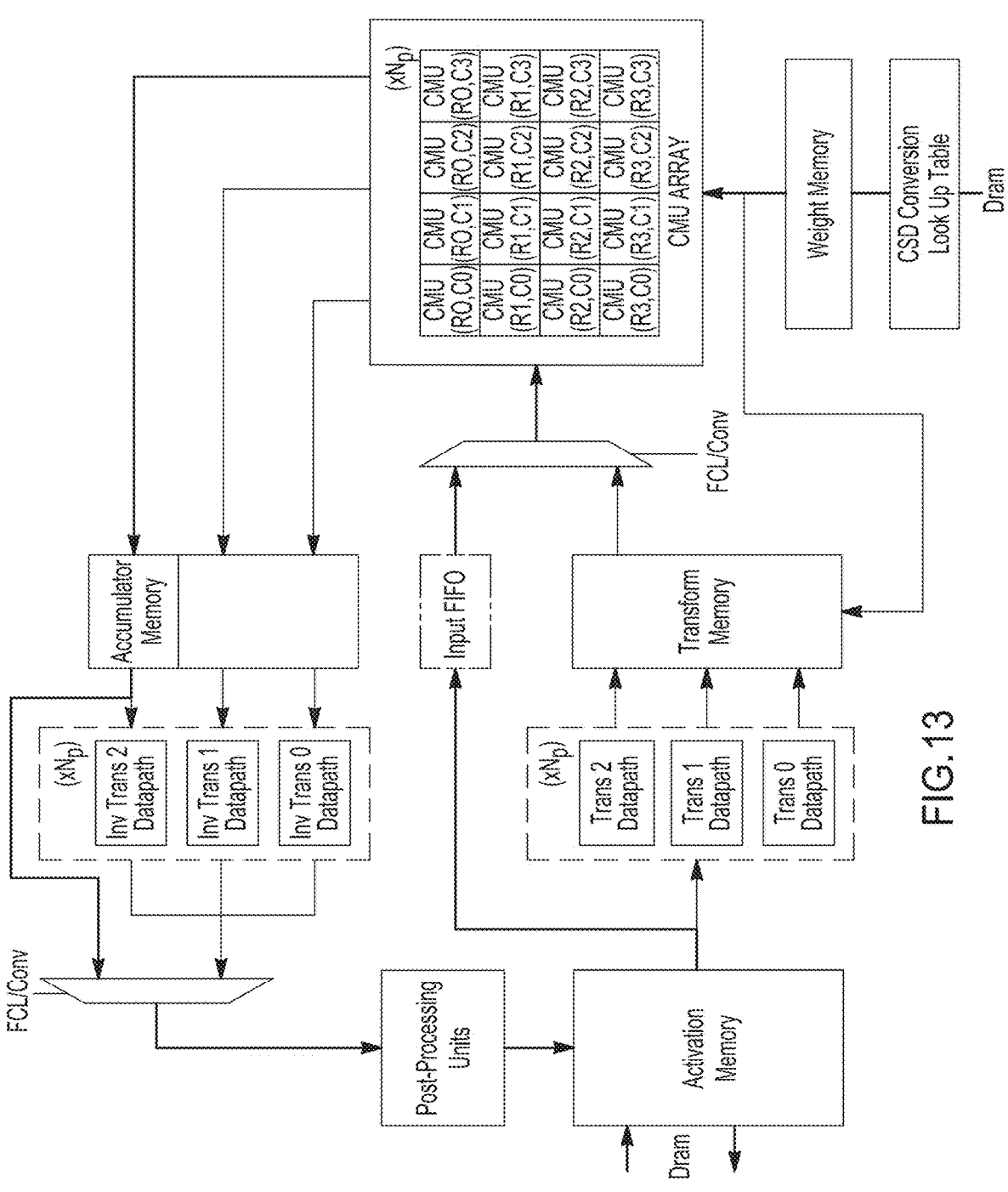
FIG. 13 is a diagram of the fully-connected layer path in the overall architecture.

The execution of a fully connected layer is illustrated in FIG. 13 where inactive paths related to transform-domain convolution are greyed out. An input stationary dataflow is employed for fully connected layers where only non-zero activation values in the input FIFO are detected and broadcast to the CMU array. In addition, implement outer-product matrix-vector multiplication for the full CMU array utilization using only $$\frac{1}{n_t}$$

or the accumulator memory banks. CBB structured sparse weights are represented using the proposed index-based encoding method. CBB structured sparsity parameters C and B are selected in conjunction with the architecture configuration parameter $N_p$ and the 4×4 patch-based dataflow. In order to share the datapath between transform-domain convolution and sparse fully connected layer without degrading MAC array utilization, select C=4×4×$N_p$ and B=N. Each one of the 4×4 utilized accumulator memory bank maps to one of the C/B rows in the reshaped columns of W shown in FIG. 7. Each weight block maps to an address in an accumulator memory bank. The maximum number of output channels supported for FCL is bounded by $$4 \times 4 \times N_P \times \frac{O_C}{n_t} \text{ where } \frac{O_C}{n_t}$$

is the depth of an accumulator memory bank.

The proposed architecture is evaluated using $N_p$=4 and a tile size of I=32. Table 3 summarizes the accelerator configuration. To estimate energy-efficiency, performance, and area, fully implement the RTL design of the proposed architecture in Verilog (including control logic and compiled memories) and synthesize it using Synopsys Design Compiler with TSMC 22 nm library under the typical corner, 0.8V, and 25° C. The design is synthesized at a 500 MHz clock frequency. The area estimated from the synthesized result is summarized in Table III. PrimeTime PX (PTPX) is used to estimate the energy consumption of the synthesized design using the gate-level netlist and fast signal data base (FSDB) file containing switching activity data.

To compare against prior dense and sparse accelerator designs whose RTL implementations are not publicly available, a simulator was used instead of PTPX to evaluate the relative speedup and energy-efficiency of the architecture for transform-domain convolution and sparse fully-connected layers. The simulator is verified against an RTL implementation. The simulator generates SRAM and DRAM access traces. For a dense CNN accelerator benchmark, select Eyeriss and use TimeLoop to simulate its performance and memory access traces. For a sparse CNN accelerator benchmark, select SCNN and use DNNSim to simulate its performance and memory access traces. These benchmarks were chosen because their open-source TimeLoop or DNN-Sim simulation models are available for accurate comparison. For a sparse FCL benchmark, select EIE and build a cycle-accurate simulator to simulate its performance and memory access traces. Arm memory compilers in TSMC 22 nm are used to estimate the energy consumption of on-chip buffers/memories. Approximate the energy cost of DRAM accesses to 100 pJ per 8 bits. The configuration of all baseline designs are adjusted to have the same of number of multiplier instances as in the proposed architecture. Obtain the energy costs of an 8-bit conventional multiplier, an 8-bit BS-CSD multiplier, and 24/8-bit adders under the same 22 nm technology node to estimate the computation energy expenditure of SONA and baseline designs. Also include the overhead from computing the (inverse) transforms in the comparisons. Make use of two HTNN workloads, ResNet20 and VGG-Nagadomi, as well as their respective equivalent CNN workloads. Finally, provide an additional comparison against an optimized dense CNN accelerator whose RTL implementation was made available using PTPX and post-synthesis FSDB dumps to get a more accurate estimate of relative energy-efficiency for convolutional layers.

Figure 14:
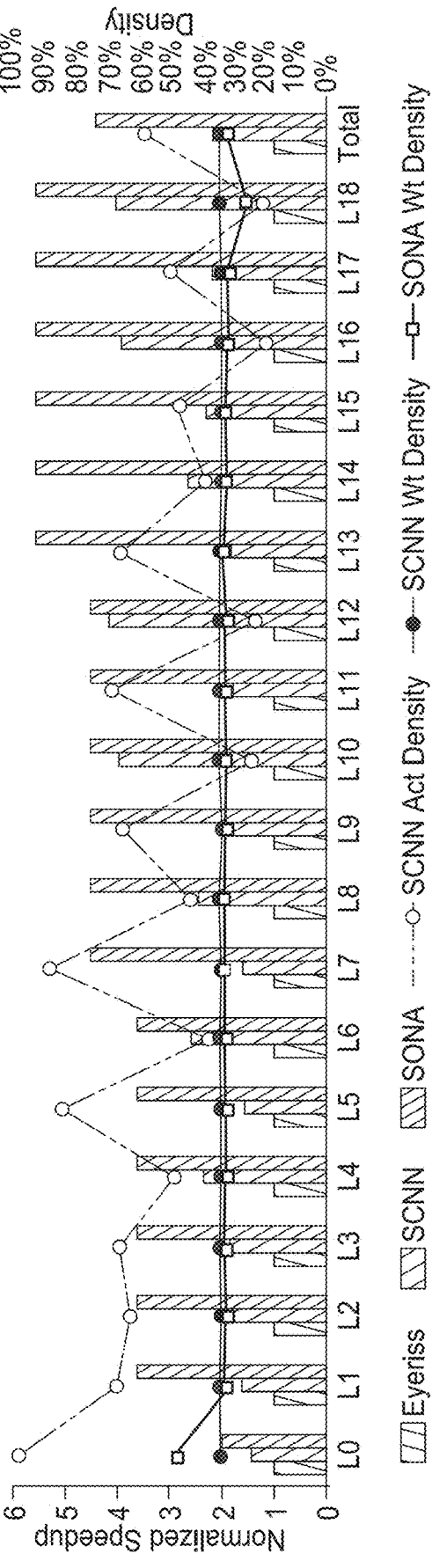
FIGS. 14 and 15 are graphs showing speedup of the proposed architecture as compared to conventional approaches for ResNet20 and VGG-nagadomi neural networks.
Figure 15:
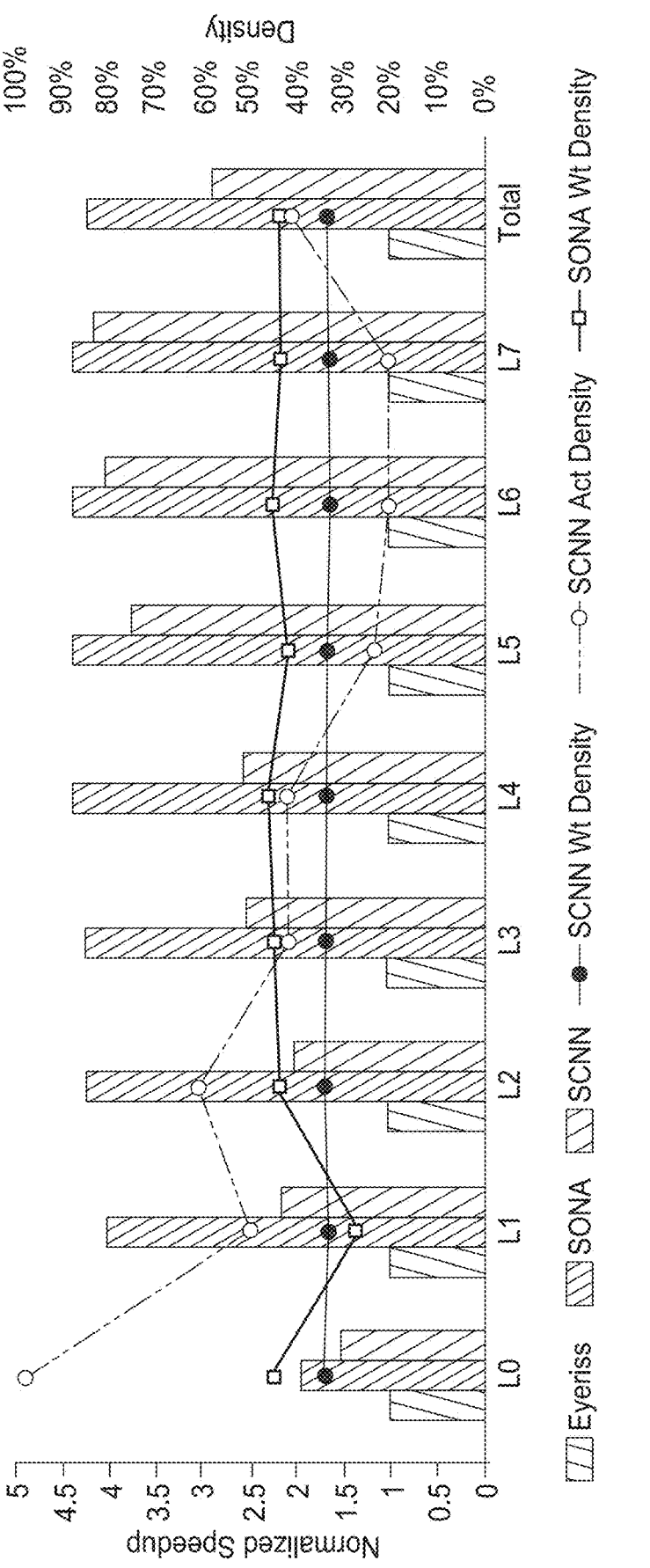

FIGS. 14 and 15 show the speedup of the proposed architecture over Eyeriss and SCNN on the different convolutional layers of ResNet20 and VGG-Nagadomi. Layers in these networks have different sizes. To highlight the speedup dependency on the sparsity of different layers in the model, include the weight density of each layer in the HTNN model as well as the activation and weight densities observed during inference using the equivalent CNN model. Note that SCNN leverages both weight and activation sparsity while the proposed architecture only leverages weight sparsity for transform-domain convolution. Nevertheless, it can be seen from the figures that the proposed architecture can achieve {4.4×, 2.1×} and {4.2×, 1.5×} overall speedup compared to {Eyeriss, SCNN} across all layers of ResNet20 and VGG-Nagadomi, respectively. Notice that the relative speedup of the proposed architecture compared to SCNN diminishes when the activation density of the sparse CNN model is unusually low (≈20%). However, the proposed architecture maintains higher speedup because it does not incur frequent execution stalls from having to match non-zero weight and activation pairs as in SCNN while concurrently computing $n_t$ output channels with minimal overhead.

Figure 16:
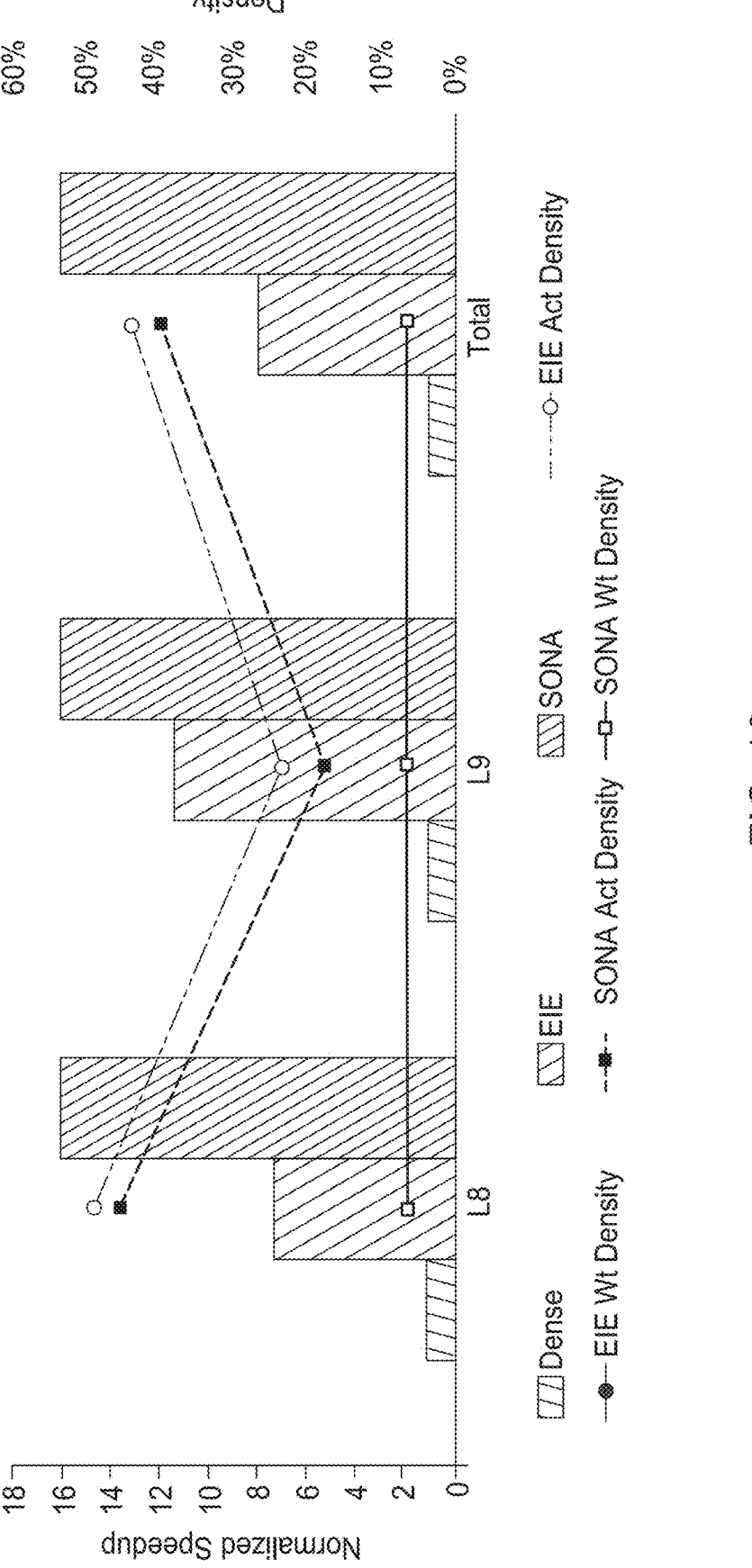
FIG. 16 is also a graph showing speedup of the proposed architecture as compared to conventional approaches for VGG-nagadomi neural network.

FIG. 16 shows the speedup of the proposed architecture over EIE on the FCLs of VGG-Nagadomi. Also include the speedup over a naive dense architecture that leverages neither weight nor activation sparsity. Similarly, the speedup dependency on the sparsity of different layers in the model is highlighted. In the case of fully connected layers, include activation density observed from the HTNN model as the proposed architecture leverages both activation sparsity as well as weight sparsity for FCLs using CBB-structured weight pruning with outer-product-based computation. It can be seen from the figure that the proposed architecture can achieve approximately 16× and 2× overall speedup compared to the naive dense architecture and EIE across FCLs of VGG-Nagadomi, respectively. Despite the existence of an activation queue, EIE suffers from load balancing issues by using compressed sparse column weight representation. CBB structured sparsity efficiently maps to the proposed architecture while maintaining full MAC array utilization by enforcing the same number of collisions in each row of the reshaped columns of a FCL's weight matrix.

Figures 17, 18:
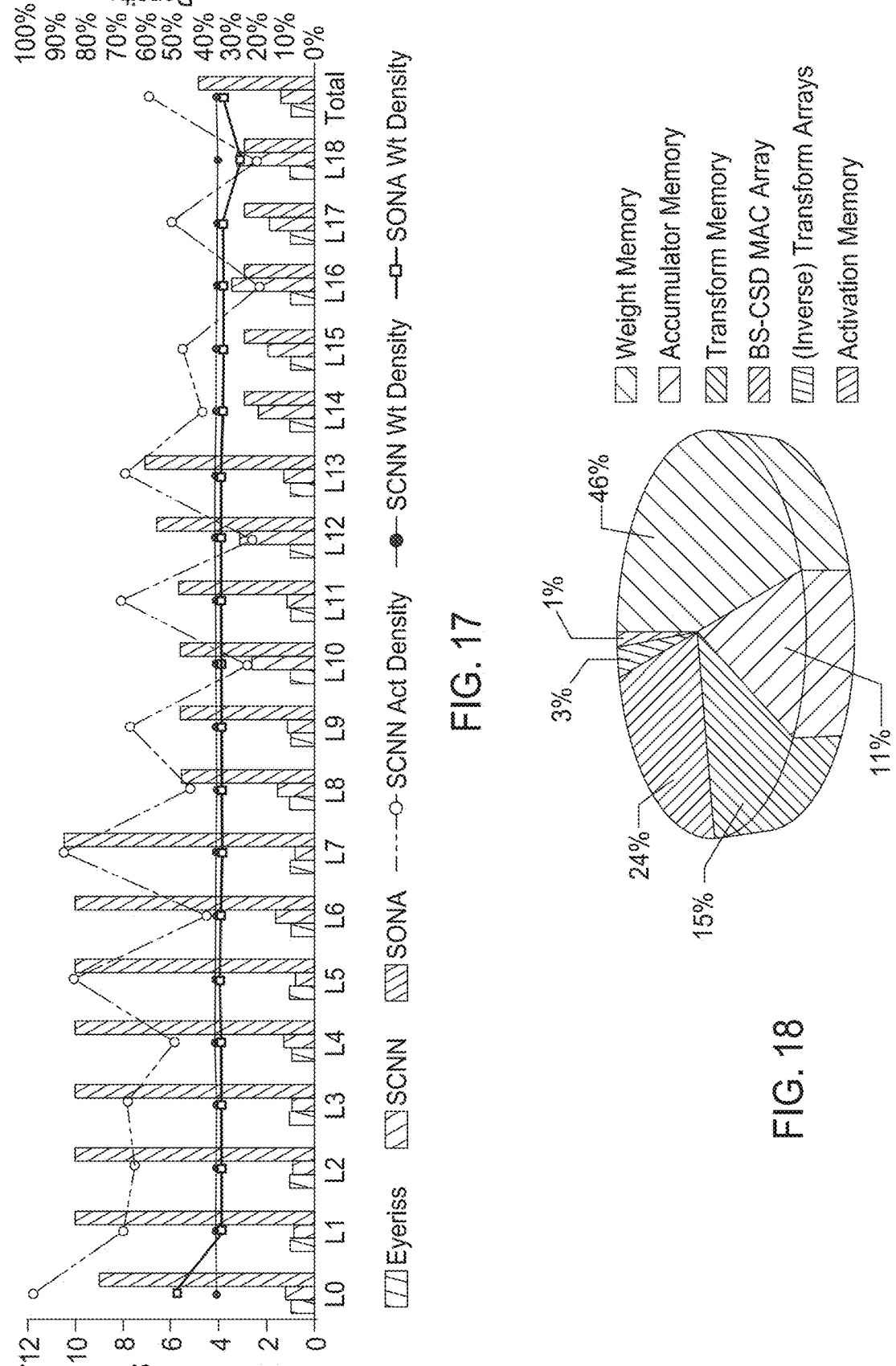
FIGS. 17 and 19 are graphs showing the relative energy efficiency of the proposed architecture as compared to conventional approaches for ResNet20 and VGG-nagadomi neural networks.
FIG. 18 is a pie chart showing energy breakdown for the proposed architecture for ResNet20 neural network.

FIGS. 17 and 18 show the relative energy-efficiency of the proposed architecture over Eyeriss and SCNN on the different convolutional layers of ResNet20 and VGG-Nagadomi. It can be seen from the figures that the proposed architecture can achieve {4.8×, 3.4×} and {3.9×, 1.7×} overall energy-efficiency gain compared to {Eyeriss, SCNN} across all layers of ResNet20 and VGG-Nagadomi, respectively. Notice that the proposed architecture maintains higher energy-efficiency despite lower weight density (in transform-domain) compared to SCNN in the case of VGG-Nagadomi. In addition, notice that the relative energy-efficiency gain of the proposed architecture compared to SCNN diminishes when the activation density of the sparse CNN model is unusually low (≈20%) because the proposed architecture does not exploit the activation sparsity as SCNN does.

Figure 19:
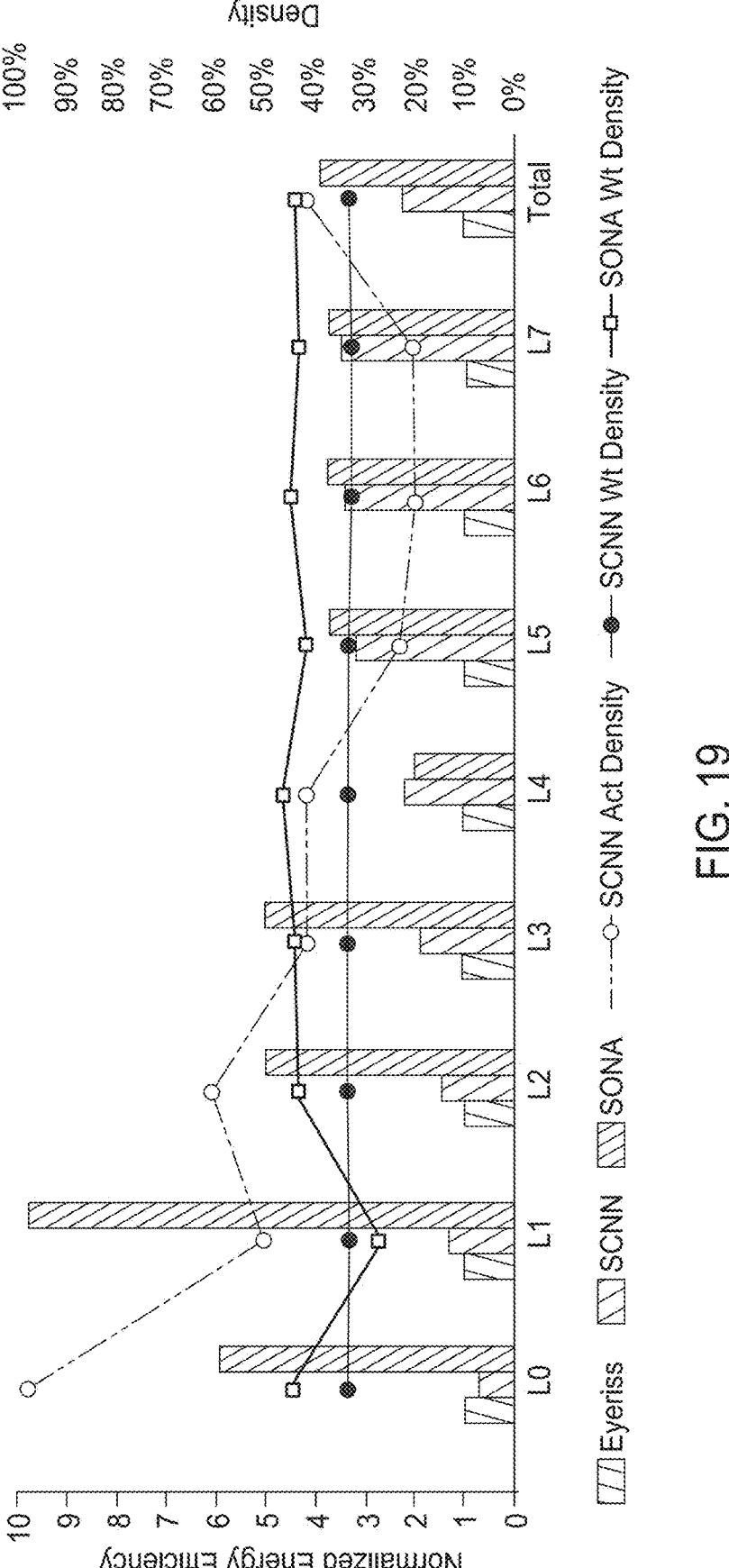

SCNN suffers from having to make unnecessary memory accesses because of its choice of input stationary dataflow tailored to handle the unstructured nature of sparsity. This disadvantage is not as noticeable in the case of later layers in ResNet20 and VGG-Nagadomi where the activation density is very low (≈20%) and the input feature map spatial dimensions are small. However, FIGS. 17 and 19 show that in the case of earlier layers with larger activation densities (in the range of 70-50%) and larger input feature map spatial dimensions, SONA stands out because of its ability to overlap the weight kernels and efficiently process sparse-orthogonal WHT domain convolution using an output stationary dataflow. FIG. 15 shows the proposed architecture energy breakdown on ResNet20 excluding DRAM access energy. Note that the overhead of the (inverse) transform arrays is estimated to be only 3% of the proposed architecture's energy expenditure. In addition, the input transform memory access accounts for 15% of the energy which, in the absence of MASR transform memory organization, would increase by at least 1.7× as discussed in Section IV.D. Finally, the BS-CSD MAC array accounts for 24% of the total energy which, in the absence of BS-CSD, would increase by 1.6×.

Figure 20:
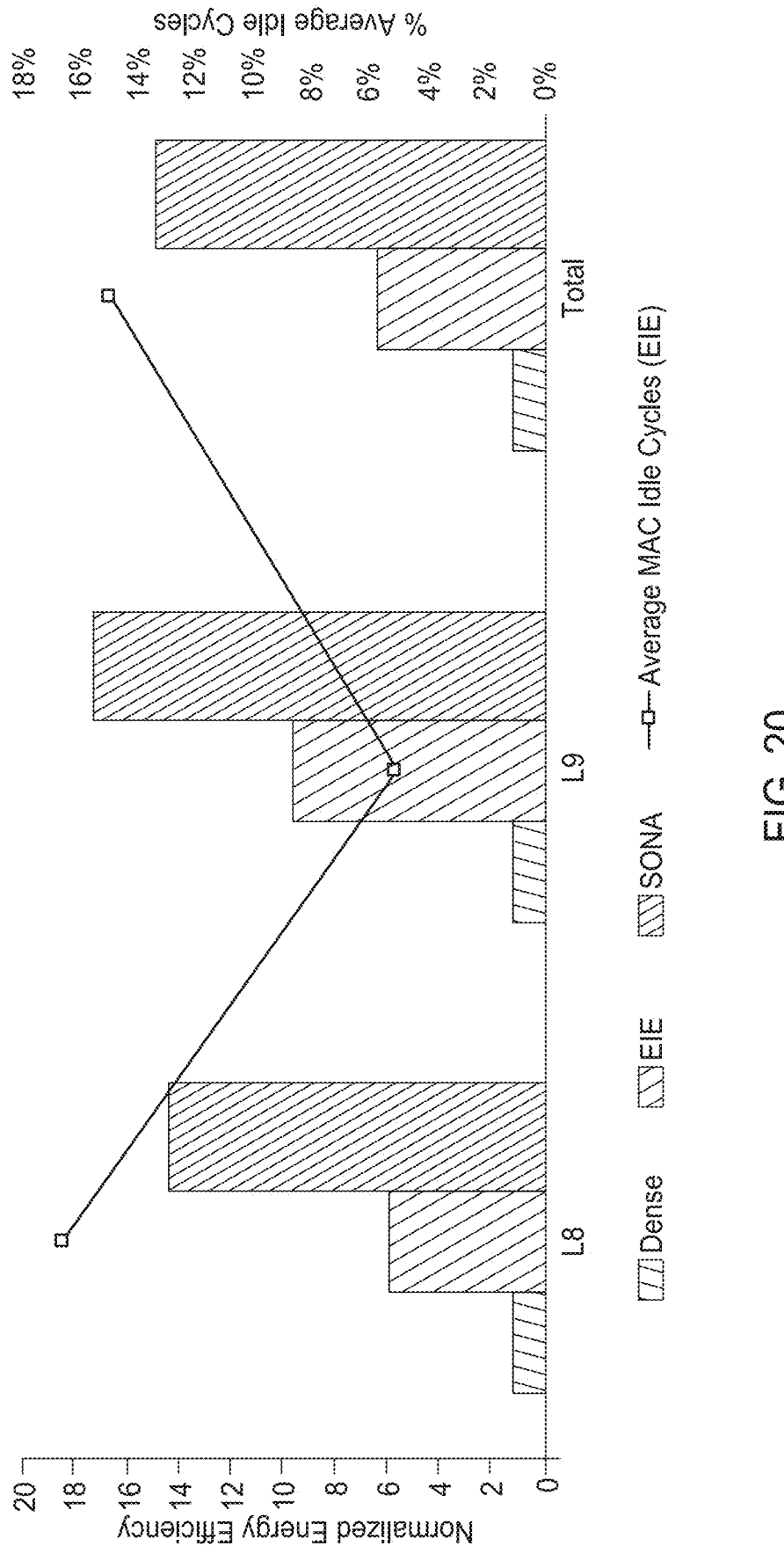
FIG. 20 is another graph showing the relative energy efficiency of the proposed architecture as compared to conventional approaches for VGG-nagadomi neural network.

FIG. 20 shows the relative energy-efficiency of the proposed architecture over EIE and the naive dense architecture on the FCLs of VGG-Nagadomi. It can be seen from the figure that SONA can achieve 14.9× and 2.4× overall energy-efficiency gain compared to the naive dense architecture and EIE across FCLs of VGG-Nagadomi, respectively. Although both approaches significantly improve the energy efficiency relative to a naïve dense architecture, the proposed architecture is able to further capitalize on CBB structured sparsity's ability to maximize memory utilization and limit the overhead of zero padding. As a result, the proposed architecture does not incur unnecessary memory storage and access.

To better capture the architecture's ability to leverage structured sparsity with minimal overhead and to better situate its relative energy-efficiency if it were to be implemented on a chip, a comparison is made using the same configuration listed in Table III against a reference synthesized CNN accelerator design using the same technology node (TSMC 22 nm) and under the same operating conditions. The results of this comparison are summarized in Table IV. The authors of the reference design have made the RTL implementation of their optimized hardware accelerator targeting dense CNNs available. The reference design makes use of an 8×8×8 MAC array that is 8× more than the number of MACs dictated by the configuration listed in Table III. Thus, to make a fair comparison, synthesize the reference CNN accelerator design at a frequency 8× lower than the HTNN architecture so that both designs have the same number of MAC operations per unit time. It is equivalent to scaling the number of MAC instances in the reference design by 8× and running both designs at the same clock frequency. Furthermore, exclude off-chip DRAM access energy from both designs in the comparison since the reference design stores all weights and activations in on-chip memory. Similarly, the HTNN architecture is instantiated with sufficient memory as listed in Table III for all on-chip weight storage. Systolic array processing of 2D convolution in the reference design enables aggressive data reuse among PEs and significantly reduces the memory access energy. As a result, the reference CNN accelerator reports an outstanding energy efficiency (1.5 TOPs/W) and ultra-low power consumption (170 μW) at 0.58V and 153 kHz in TSMC 40 nm. Compared to this highly optimized reference CNN accelerator, the post-synthesis HTNN architecture implementation is 3.9×more energy-efficient for ResNet20. We also observe that the synthesized HTNN architecture implementation can be up to 5×more energy efficient when evaluating layers best suited for each architecture.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

APPENDIX

TABLE I

SUMMARY OF NUMBER OF OPERATIONS PERFORMED IN A SINGLE HTNN AND SPARSE CONVOLUTIONAL LAYER.

| STEP | NUMBER OF OPERATIONS |
| --- | --- |
| HTNN WHT ADD | $8 \times 8 \times n_i \times i_c \times \dfrac{n^2}{4}$ |

TABLE I-continued

SUMMARY OF NUMBER OF OPERATIONS PERFORMED IN A
SINGLE HTNN AND SPARSE CONVOLUTIONAL LAYER.

| STEP | NUMBER OF OPERATIONS |
|---|---|
| HTNN CSD MULT | $4 \times 4 \times i_c \times \dfrac{o_c}{n_i} \times \dfrac{n^2}{4}$ |
| HTNN ACCUM. ADD | $4 \times 4 \times (i_c - 1) \times \dfrac{o_c}{n_i} \times \dfrac{n^2}{4}$ |
| HTNN I-WHT ADD | $6 \times 6 \times o_c \times \dfrac{n^2}{4}$ |
| SPARSE CNN MULT | $3 \times 3 \times i_c \times o_c \times n^2 \times d$ |
| SPARSE CNN ADD | $(3 \times 3 \times i_c - 1) \times o_c \times n^2 \times d$ |

TABLE III

| Component | Size | Area (mm$^2$) |
|---|---|---|
| Activation Memory | 420 KB | 1.262 |
| Transform Memory | 6 KB | 0.083 |
| Accumulator Memory | 18 KB | 0.192 |
| Weight Memory | 352 KB | 1.073 |
| Input FIFO | 1 KB | 0.003 |
| CMU Array | 64 CMUs | 0.023 |
| Transform Array | 12 datapaths | 0.039 |
| Inverse Transform Array | 12 datapaths | 0.022 |
| Other | N/A | 0.152 |
| Total | NA | 2.85 |

TABLE IV

| Design synthesized in 22 nm at 0.8 V | SONA | [3] |
|---|---|---|
| # MACs | 64 | 512 |
| Clock Frequency (MHz) | 500 | 62.5 |
| Energy Efficiency (Inferences/ Joule, ResNet20) | 60247 | 15610 |

What is claimed is:

1. A computer-implemented method for performing a computation with a neural network, comprising:

receiving a first input patch of data, where the first input patch is a matrix extracted from an input;

applying a Walsh-Hadamard transform to the first input patch to yield a transformed input patch in a transformed domain;

computing an element-wise product of the transformed input patch and a kernel of the neural network, where the kernel is trained in the transformed domain;

applying an inverse Walsh-Hadamard transform to the element-wise product to yield an intermediate matrix; and creating a first output patch from the intermediate matrix, where the size of the first output patch is smaller than the intermediate matrix.

2. The computer-implemented method of claim 1 further comprises creating the first output patch from the intermediate matrix by selecting inner most elements of the intermediate matrix.

3. The computer-implemented method further comprises receiving a second input patch of data from the input and repeating the steps of claim 1 for the second input patch to yield a second output patch, where the second input patch differs from the first input patch.

4. The computer-implemented method of claim 3 further comprises assembling the first output patch and the second output patch into a feature map, and inputting the feature map into a next layer of the neural network.

5. The computer-implemented method further comprises receiving an input having two or more input channels of data and processing each of the two or more input channels in a respective transform domain according to claim 1.

6. The computer-implemented method of claim 5 further comprises training kernels of the neural network such that non-zero kernel weights of the neural network are strictly non-overlapping across the transform domains.

7. A computer-implemented method for performing a computation on an input with a neural network, the input having two or more channels of data comprising:

receiving a first set of input patches, where each input patch in the first set of input patches corresponds to a different channel of the input and each input patch in the first set of input patches is extracted from the same location in the input;

for each input patch in the first set of input patches, processing a given input patch in two or more transform domains to yield an intermediate matrix for each of the two or more transform domains;

summing the intermediate matrices in a given transform domain together; and for each of the two or more transform domains, creating a first output patch from the summed intermediate matrix, where the size of the first output patch is smaller than the summed intermediate matrix;

wherein processing a given input patch in a given transform domain includes applying a Walsh-Hadamard transform to a given input patch to yield a transformed input patch in the given transform domain and computing an element-wise product of the transformed input patch and a kernel of the neural network, where the kernel is trained in the given transform domain.

8. The computer-implemented method of claim 7 wherein processing a given input patch in two or more transform domains includes applying a unique variant of the Walsh-Hadamard transform for each of the two or more transform domains.

9. The computer-implemented method of claim 7 further comprises training kernels in present layer of the neural network such that positions of non-zero kernel weights are strictly non-overlapping across the two or more transform domains.

10. The computer-implemented method of claim 7 further comprises, for each of the two or more transform domains, applying an inverse Walsh-Hadamard transform to the summed intermediate matrix prior to creating a first output patch.

11. The computer-implemented method of claim 7 further comprises creating the first output patch from the summed intermediate matrix by selecting inner most elements of the summed intermediate matrix.

12. The computer-implemented method further comprises receiving a second set of input patches, where each input patch in the second set of input patches corresponds to a different channel of the input and each input patch in the second set of input patches is extracted from the same location in the input; and repeating the steps of claim 7 for the second set of input patches to yield a second set of output patches.

13. The computer-implemented method of claim 12 further comprises, for each of the two or more transform domains, assembling output patches for a given transform domain into a feature map for the given transform domain, and inputting the feature maps into a next layer of the neural network.

14. A computer-implemented method for performing computation in a hidden layer of a neural network, the hidden layer having a plurality of the input channels and a plurality of output channels, comprising:

a) receiving an input patch of data from an input feature map;

b) processing the input patch in two or more transform domains to yield a transformed input matrix;

c) selecting a given output channel from the plurality of output channels;

d) for each input channel in the plurality of input channels, computing an element-wise product of the transformed input matrix and a given kernel to yield an intermediate matrix, where the given kernel corresponds to the input channel and the given output channel and the given kernel is trained in the transformed domains;

e) summing the intermediate matrices in a given domain together;

f) creating an output patch for an output feature map from the summed intermediate matrices; and g) selecting another output channel from the plurality of output channels and repeating steps d)-f) until each output channel in the plurality of output channels has been processed.

15. The computer-implemented method of claim 14 wherein processing the input patch includes applying a unique variant of the Walsh-Hadamard transform for each of the two or more transform domains to the input patch to yield a transformed input patch in each of the two or more transform domains and combining the transformed input patches to form the transformed input matrix.

16. The computer-implemented method of claim 15 further comprises storing the transformed input patches for the two or more transform domains in a transform memory of a computing device.

17. The computer-implemented method of claim 16 further comprises processing N patches of data from the input feature map concurrently in M transform domains and storing the transformed N patches for the M transform domains in the transform memory.

18. The computer-implemented method of claim 17 further comprises processing N output channels concurrently with the N patches of data from the input feature map.

19. The computer-implemented method of claim 17 further comprises arranging the transformed N patches into N×M×4×4 memory banks with depth I and word width is number of bits comprising kernel weight, where I is tile size for the number of input channels and each memory bank is accessed independently.

20. The computer-implemented method of claim 14 further comprises storing a plurality of kernels in a buffer of a computing device, where each kernel maps to a different combination of an input channel from the plurality of input channels and an output channel from the plurality of output channels.

21. The computer-implemented method of claim 20 further comprises training kernels in the plurality of kernels such that positions of non-zero kernel weights are strictly non-overlapping across the two or more transform domains.

22. The computer-implemented method of claim 14 further comprises demultiplexing the element-wise product before the step of summing the intermediate matrices in a given domain together.

23. The computer-implemented method of claim 22 further comprises, for each of the two or more transform domains, applying an inverse Walsh-Hadamard transform to the summed intermediate matrix prior to the step of creating an output patch.

24. The computer-implemented method of claim 14 further comprises selecting another input patch from the input feature map and repeating steps b)-g).

* * * * *